US011113852B2

(12) United States Patent
Garvey et al.

(10) Patent No.: US 11,113,852 B2
(45) Date of Patent: *Sep. 7, 2021

(54) SYSTEMS AND METHODS FOR TRENDING PATTERNS WITHIN TIME-SERIES DATA

(71) Applicant: Oracle International Corporation, Redwood Shores, CA (US)

(72) Inventors: Dustin Garvey, Oakland, CA (US); Sampanna Shahaji Salunke, Dublin, CA (US); Uri Shaft, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/266,987

(22) Filed: Sep. 15, 2016

(65) Prior Publication Data
US 2017/0249649 A1    Aug. 31, 2017

Related U.S. Application Data

(60) Provisional application No. 62/301,590, filed on Feb. 29, 2016, provisional application No. 62/301,585, filed on Feb. 29, 2016.

(51) Int. Cl.
G06Q 30/02        (2012.01)
G06Q 10/04        (2012.01)
(Continued)

(52) U.S. Cl.
CPC ........ *G06T 11/206* (2013.01); *G06F 11/3452* (2013.01); *G06F 17/18* (2013.01);
(Continued)

(58) Field of Classification Search
CPC .............. G06Q 30/0202; G06Q 10/04; G06Q 10/06315
See application file for complete search history.

(56) References Cited

U.S. PATENT DOCUMENTS 6,298,063 B1   10/2001  Coile et al.
6,438,592 B1    8/2002  Killian
(Continued)

FOREIGN PATENT DOCUMENTS

CN    105426411 A    3/2016
CN    109359763 A    2/2019
(Continued)

OTHER PUBLICATIONS

Greunen, "Forecasting Methods for Cloud Hosted Resources, a comparison," 2015, 11th International Conference on Network and Service Management (CNSM), pp. 29-35 (Year: 2015).*

(Continued)

*Primary Examiner* — Ivan R Goldberg
(74) *Attorney, Agent, or Firm* — Invoke

(57)    ABSTRACT

Systems and methods for trending patterns within a set of time-series data are described. In one or more embodiments, a set of one or more groups of data points that are associated with a particular seasonal pattern are generated within volatile and/or non-volatile storage. A set of pairwise slopes is determined for data point pairs within the set of one or more groups of data points. Based, at least in part on the plurality of pairwise slopes, a representative trend rate for the particular seasonal pattern is determined. A set of forecasted values is then generated within volatile or non-volatile storage based, at least in part, on the representative trend rate for the particular seasonal pattern.

20 Claims, 14 Drawing Sheets

(51) Int. Cl.
| | |
|---|---|
| *G06F 17/18* | (2006.01) |
| *G06Q 10/06* | (2012.01) |
| *G06F 11/34* | (2006.01) |
| *G06F 9/50* | (2006.01) |
| *G06T 11/20* | (2006.01) |
| *G06N 20/00* | (2019.01) |
| *G06F 21/55* | (2013.01) |
| *G06K 9/00* | (2006.01) |
| *G06K 9/62* | (2006.01) |
| *G06Q 10/10* | (2012.01) |
| *G06T 11/00* | (2006.01) |
| *H04L 12/24* | (2006.01) |

(52) U.S. Cl.
CPC ......... *G06F 21/55* (2013.01); *G06K 9/00536* (2013.01); *G06K 9/628* (2013.01); *G06N 20/00* (2019.01); *G06Q 10/04* (2013.01); *G06Q 10/06* (2013.01); *G06Q 10/0631* (2013.01); *G06Q 10/1093* (2013.01); *G06Q 30/0202* (2013.01); *G06T 11/001* (2013.01); *G06F 9/505* (2013.01); *G06Q 10/06315* (2013.01); *H04L 41/0896* (2013.01)

(56) References Cited

U.S. PATENT DOCUMENTS

| | | | |
|---|---|---|---|
| 6,597,777 B1 | 7/2003 | Ho | |
| 6,643,613 B2 | 11/2003 | McGee et al. | |
| 6,996,599 B1 | 2/2006 | Anders et al. | |
| 7,343,375 B1 | 3/2008 | Dulac | |
| 7,529,991 B2 | 5/2009 | Ide et al. | |
| 7,672,814 B1 | 3/2010 | Raanan et al. | |
| 7,739,143 B1 | 6/2010 | Dwarakanath et al. | |
| 7,739,284 B2 | 6/2010 | Aggarwal et al. | |
| 7,783,510 B1 | 8/2010 | Gilgur et al. | |
| 7,987,106 B1 | 7/2011 | Aykin | |
| 8,200,454 B2 | 6/2012 | Dorneich et al. | |
| 8,229,876 B2 | 7/2012 | Roychowdhury | |
| 8,234,236 B2 | 7/2012 | Beaty et al. | |
| 8,363,961 B1 | 1/2013 | Avidan et al. | |
| 8,576,964 B2 | 11/2013 | Taniguchi et al. | |
| 8,583,649 B2 | 11/2013 | Ailon et al. | |
| 8,635,328 B2 | 1/2014 | Corley et al. | |
| 8,650,299 B1 | 2/2014 | Huang et al. | |
| 8,676,964 B2 | 3/2014 | Gopalan et al. | |
| 8,694,969 B2 | 4/2014 | Bernardini et al. | |
| 8,776,066 B2 | 7/2014 | Krishnamurthy et al. | |
| 8,880,525 B2 | 11/2014 | Galle et al. | |
| 8,930,757 B2 | 1/2015 | Nakagawa | |
| 8,949,677 B1 | 2/2015 | Brundage et al. | |
| 9,002,774 B2 | 4/2015 | Karlsson | |
| 9,053,171 B2 | 6/2015 | Ailon et al. | |
| 9,141,914 B2 | 9/2015 | Viswanathan et al. | |
| 9,147,167 B2 | 9/2015 | Urmanov et al. | |
| 9,195,563 B2 | 11/2015 | Scarpelli | |
| 9,218,232 B2 | 12/2015 | Khalastchi et al. | |
| 9,292,408 B2 | 3/2016 | Bernstein et al. | |
| 9,323,599 B1 | 4/2016 | Iyer et al. | |
| 9,323,837 B2 | 4/2016 | Zhao et al. | |
| 9,330,119 B2 | 5/2016 | Chan et al. | |
| 9,355,357 B2 | 5/2016 | Hao et al. | |
| 9,367,382 B2 | 6/2016 | Yabuki | |
| 9,389,946 B2 | 7/2016 | Higuchi | |
| 9,471,778 B1 | 10/2016 | Seo et al. | |
| 9,495,220 B2 | 11/2016 | Talyansky | |
| 9,495,395 B2 | 11/2016 | Chan et al. | |
| 9,507,718 B2 | 11/2016 | Rash et al. | |
| 9,514,213 B2 | 12/2016 | Wood et al. | |
| 9,529,630 B1 | 12/2016 | Fakhouri et al. | |
| 9,658,916 B2 | 5/2017 | Yoshinaga et al. | |
| 9,692,662 B2 | 6/2017 | Chan et al. | |
| 9,710,493 B2 | 7/2017 | Wang et al. | |
| 9,727,533 B2 | 8/2017 | Thibaux | |
| 9,740,402 B2 | 8/2017 | Manoharan et al. | |
| 9,779,361 B2 | 10/2017 | Jones et al. | |
| 9,811,394 B1 | 11/2017 | Kogias et al. | |
| 9,961,571 B2 | 5/2018 | Yang et al. | |
| 10,073,906 B2 | 9/2018 | Lu et al. | |
| 10,210,036 B2 | 2/2019 | Iyer et al. | |
| 10,331,802 B2 | 6/2019 | Garvey et al. | |
| 10,692,255 B2 | 6/2020 | Garvey et al. | |
| 10,699,211 B2 | 6/2020 | Garvey et al. | |
| 10,885,461 B2 | 1/2021 | Garvey et al. | |
| 10,915,830 B2 | 2/2021 | Garvey et al. | |
| 2002/0019860 A1 | 2/2002 | Lee et al. | |
| 2002/0092004 A1 | 7/2002 | Lee et al. | |
| 2002/0183972 A1 | 12/2002 | Enck et al. | |
| 2002/0188650 A1 | 12/2002 | Sun et al. | |
| 2003/0149603 A1 | 8/2003 | Ferguson et al. | |
| 2003/0224344 A1 | 12/2003 | Shamir et al. | |
| 2004/0088406 A1* | 5/2004 | Corley | H04L 41/064 709/224 |
| 2005/0119982 A1 | 6/2005 | Ito et al. | |
| 2005/0132030 A1 | 6/2005 | Hopen et al. | |
| 2005/0159927 A1 | 7/2005 | Cruz et al. | |
| 2005/0193281 A1 | 9/2005 | Ide et al. | |
| 2006/0087962 A1 | 4/2006 | Golia et al. | |
| 2006/0106743 A1 | 5/2006 | Horvitz | |
| 2006/0106797 A1 | 5/2006 | Srinivasa et al. | |
| 2006/0161485 A1 | 7/2006 | Meldahl | |
| 2006/0212593 A1 | 9/2006 | Patrick et al. | |
| 2006/0287848 A1 | 12/2006 | Li et al. | |
| 2007/0011281 A1 | 1/2007 | Jhoney et al. | |
| 2007/0150329 A1 | 6/2007 | Brook et al. | |
| 2007/0179836 A1 | 8/2007 | Juang et al. | |
| 2008/0221974 A1* | 9/2008 | Gilgur | G06Q 10/04 705/7.31 |
| 2008/0288089 A1 | 11/2008 | Pettus et al. | |
| 2009/0024427 A1 | 1/2009 | Shan | |
| 2009/0030752 A1 | 1/2009 | Senturk-Doganaksoy et al. | |
| 2010/0027552 A1 | 2/2010 | Hill | |
| 2010/0036857 A1 | 2/2010 | Marvasti et al. | |
| 2010/0050023 A1 | 2/2010 | Scarpelli et al. | |
| 2010/0082132 A1 | 4/2010 | Marruchella et al. | |
| 2010/0082697 A1 | 4/2010 | Gupta et al. | |
| 2010/0185499 A1* | 7/2010 | Dwarakanath | G06Q 10/04 705/7.31 |
| 2010/0257133 A1* | 10/2010 | Crowe | G06Q 10/10 706/58 |
| 2010/0324869 A1 | 12/2010 | Cherkasova et al. | |
| 2011/0022879 A1 | 1/2011 | Chavda et al. | |
| 2011/0040575 A1 | 2/2011 | Wright et al. | |
| 2011/0125894 A1 | 5/2011 | Anderson et al. | |
| 2011/0126197 A1 | 5/2011 | Larsen et al. | |
| 2011/0126275 A1 | 5/2011 | Anderson et al. | |
| 2011/0213788 A1 | 9/2011 | Zhao et al. | |
| 2011/0265164 A1 | 10/2011 | Lucovsky et al. | |
| 2012/0005359 A1 | 1/2012 | Seago et al. | |
| 2012/0051369 A1 | 3/2012 | Bryan et al. | |
| 2012/0066389 A1 | 3/2012 | Hegde et al. | |
| 2012/0110462 A1 | 5/2012 | Eswaran et al. | |
| 2012/0110583 A1 | 5/2012 | Balko et al. | |
| 2012/0203823 A1 | 8/2012 | Manglik et al. | |
| 2012/0240072 A1 | 9/2012 | Altamura et al. | |
| 2012/0254183 A1 | 10/2012 | Ailon et al. | |
| 2012/0278663 A1 | 11/2012 | Hasegawa | |
| 2012/0323988 A1 | 12/2012 | Barzel et al. | |
| 2013/0024173 A1 | 1/2013 | Brzezicki et al. | |
| 2013/0080374 A1* | 3/2013 | Karlsson | G06Q 10/04 706/52 |
| 2013/0151179 A1 | 6/2013 | Gray | |
| 2013/0226320 A1 | 8/2013 | Berg-Sonne et al. | |
| 2013/0282891 A1 | 10/2013 | Davis et al. | |
| 2013/0326202 A1 | 12/2013 | Rosenthal et al. | |
| 2013/0329981 A1 | 12/2013 | Hiroike | |
| 2014/0058572 A1 | 2/2014 | Stein et al. | |
| 2014/0067757 A1 | 3/2014 | Ailon et al. | |
| 2014/0095422 A1* | 4/2014 | Solomon | G06Q 10/06312 706/46 |
| 2014/0101300 A1 | 4/2014 | Rosensweig et al. | |
| 2014/0215470 A1 | 7/2014 | Iniguez | |

(56) References Cited

U.S. PATENT DOCUMENTS

| | | | |
|---|---|---|---|
| 2014/0310235 A1* | 10/2014 | Chan | G06F 17/30598 707/603 |
| 2014/0310714 A1* | 10/2014 | Chan | G06F 9/4881 718/102 |
| 2014/0325649 A1 | 10/2014 | Zhang | |
| 2014/0379717 A1 | 12/2014 | Urmanov et al. | |
| 2015/0032775 A1 | 1/2015 | Yang et al. | |
| 2015/0033084 A1 | 1/2015 | Sasturkar et al. | |
| 2015/0040142 A1 | 2/2015 | Cheetancheri et al. | |
| 2015/0046123 A1 | 2/2015 | Kato | |
| 2015/0046920 A1 | 2/2015 | Allen | |
| 2015/0065121 A1 | 3/2015 | Gupta et al. | |
| 2015/0180734 A1 | 6/2015 | Maes et al. | |
| 2015/0242243 A1 | 8/2015 | Balakrishnan et al. | |
| 2015/0244597 A1 | 8/2015 | Maes et al. | |
| 2015/0248446 A1 | 9/2015 | Nordstrom et al. | |
| 2015/0251074 A1 | 9/2015 | Ahmed et al. | |
| 2015/0296030 A1 | 10/2015 | Maes et al. | |
| 2015/0302318 A1 | 10/2015 | Chen et al. | |
| 2015/0312274 A1 | 10/2015 | Bishop et al. | |
| 2015/0317589 A1 | 11/2015 | Anderson et al. | |
| 2015/0371144 A1 | 12/2015 | Engle | |
| 2016/0034328 A1 | 2/2016 | Poola et al. | |
| 2016/0042289 A1 | 2/2016 | Poola et al. | |
| 2016/0092516 A1 | 3/2016 | Poola et al. | |
| 2016/0105327 A9* | 4/2016 | Cremonesi | G06Q 10/06 706/21 |
| 2016/0139964 A1 | 5/2016 | Chen et al. | |
| 2016/0171037 A1 | 6/2016 | Mathur et al. | |
| 2016/0253381 A1 | 9/2016 | Kim et al. | |
| 2016/0283533 A1 | 9/2016 | Urmanov et al. | |
| 2016/0292611 A1 | 10/2016 | Boe et al. | |
| 2016/0294773 A1 | 10/2016 | Yu et al. | |
| 2016/0299938 A1 | 10/2016 | Malhotra et al. | |
| 2016/0299961 A1 | 10/2016 | Olsen | |
| 2016/0321588 A1* | 11/2016 | Das | G06Q 10/06315 |
| 2016/0342909 A1* | 11/2016 | Chu | G06Q 10/063 |
| 2016/0357674 A1 | 12/2016 | Waldspurger et al. | |
| 2016/0378809 A1 | 12/2016 | Chen et al. | |
| 2017/0061321 A1 | 3/2017 | Maiya et al. | |
| 2017/0249564 A1 | 8/2017 | Garvey et al. | |
| 2017/0249648 A1 | 8/2017 | Garvey et al. | |
| 2017/0249649 A1 | 8/2017 | Garvey et al. | |
| 2017/0249763 A1 | 8/2017 | Garvey et al. | |
| 2017/0262223 A1 | 9/2017 | Dalmatov et al. | |
| 2017/0329660 A1 | 11/2017 | Salunke et al. | |
| 2017/0351563 A1 | 12/2017 | Miki et al. | |
| 2017/0364851 A1 | 12/2017 | Maheshwari et al. | |
| 2018/0026907 A1 | 1/2018 | Miller et al. | |
| 2018/0039555 A1 | 2/2018 | Salunke et al. | |
| 2018/0052804 A1 | 2/2018 | Mikami et al. | |
| 2018/0053207 A1 | 2/2018 | Modani et al. | |
| 2018/0059628 A1 | 3/2018 | Yoshida | |
| 2018/0081629 A1 | 3/2018 | Kuhhirte et al. | |
| 2018/0219889 A1 | 8/2018 | Oliner et al. | |
| 2018/0268152 A1 | 9/2018 | Cuomo et al. | |
| 2018/0321989 A1 | 11/2018 | Shetty et al. | |
| 2018/0324199 A1 | 11/2018 | Crotinger et al. | |
| 2018/0330433 A1 | 11/2018 | Frenzel et al. | |
| 2018/0349797 A1 | 12/2018 | Garvey et al. | |
| 2018/0351786 A1 | 12/2018 | Pope et al. | |
| 2019/0042982 A1 | 2/2019 | Qu et al. | |
| 2019/0065275 A1 | 2/2019 | Wong et al. | |
| 2019/0305876 A1 | 10/2019 | Sundaresan et al. | |
| 2020/0034745 A1 | 1/2020 | Nagpal et al. | |

FOREIGN PATENT DOCUMENTS

| | | |
|---|---|---|
| JP | 2006-129446 A | 5/2006 |
| WO | 2011/071624 A2 | 6/2011 |
| WO | 2013/016584 A1 | 1/2013 |

OTHER PUBLICATIONS

Suntinger, "Trend-based similarity search in time-series data," 2010, Second International Conference on Advances in Databases, Knowledge, and Data Applications, IEEE, pp. 97-106 (Year: 2010).*

Niino, Junichi, "Open Source Cloud Infrustructure 'OpenStak', its History and Scheme", available online at <http://www.publickey1.jp/blog/11/openstack_1.html>, Jun. 13, 2011, 8 pages.

Slipetskyy, Rostyslav, "Security Issues in OpenStack", Master's Thesis, Technical University of Denmark, Jun. 2011, 90 pages.

Voras et al.,"Criteria for evaluation of Open Source Cloud Computing Solutions", Information Technology Interfaces (ITI), Proceedings of the ITI 2011 33rd International Conference on Information Technology Interfaces, US, IEEE, Jun. 27-30, 2011, pp. 137-142.

Haugen et al., "Extracting Common Time Trends from Concurrent Time Series: Maximum Autocorrelation Factors with Applications", Stanford University, Oct. 20, 2015, pp. 1-38.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Taylor et al., "Forecasting Intraday Time Series With Multiple Seasonal Cycles Using Parsimonious Seasonal Exponential Smoothing", Omega, vol. 40, No. 6, Dec. 2012, pp. 748-757.

Yokoyama, Tetsuya, "Windows Server 2008 Test Results Part 5 Letter", No. 702 (Temporary issue number), Apr. 15, 2008, pp. 124-125.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Nurmi D et al: "The Eucalyptus Open-Source Cloud-Computing System", Cluster Computing and the Grid, 2009. CCGRID '09. 9th IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Jarvis, R. A., et al., "Clustering Using a Similarity Measure Based on Shared Neighbors", IEEE Transactions on Computers, vol. C-22, No. 11, Nov. 1973, pp. 1025-1034.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved

(56) References Cited

OTHER PUBLICATIONS from the Internet: URL:http://opennebula.org/setting-up-highavailability-in-opennebula-with-lvm/ [retrieved on Aug. 13, 2015] p. 1.
"OpenStack Object Storage Administrator Manual", Jun. 2, 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].
"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].
Charapko, Gorilla—Facebook's Cache for Time Series Data, http://charap.co/gorilla-facebooks-cache-for-monitoring-data/, Jan. 11, 2017.
Wilks, Samuel S. "Determination of sample sizes for setting tolerance limits," The Annals of Mathematical Statistics 12.1 (1941): 91-96.
Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.
Lin, Xuemin, et al. "Continuously maintaining quantile summaries of the most recent n elements over a data stream," IEEE, 2004.
Greenwald et al. "Space-efficient online computation of quantile summaries." ACM Proceedings of the 2001 SIGMOD international conference on Management of data pp. 58-66.
Hao et al., Visual Analytics of Anomaly Detection in Large Data Streams, Proc. SPIE 7243, Visualization and Data Analysis 2009, 10 pages.
Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.
Ahmed, Reservoir-based network traffic stream summarization for anomaly detection, Article in Pattern Analysis and Applications, Oct. 2017.
Herbst, "Self-adaptive workload classification and forecasting for proactive resource provisioning", 2014, ICPE'13, pp. 187-198 (Year: 2014).
Faraz Rasheed, "A Framework for Periodic Outlier Pattern Detection in Time-Series Sequences," May 2014, IEEE.
"Time Series Pattern Search: A tool to extract events from time series data", available online at <https://www.ceadar.ie/pages/time-series-pattern-search/>, retrieved on Apr. 24, 2020, 4 pages.
Time Series Pattern Search: A tool to extract events from time series data, available online at <https://www.ceadar.ie/pages/time-series-pattem-search/>, retrieved on Apr. 24, 2020, 4 pages.
Yin, "System resource utilization analysis and prediction for cloud based applications under bursty workloads," 2014, Information Sciences, vol. 279, pp. 338-357 (Year: 2014).
Li et al., "Forecasting Web Page Views: Methods and Observations," in 9 J. Machine Learning Res. 2217-50 (2008). (Year 2008).
Jain and Chlamtac, P-Square Algorithm for Dynamic Calculation of Quantiles and Histograms Without Storing Observations, ACM, Oct. 1985 (10 pages).
Lehmann, "Variability of Atmospheric Circulation Patterns Associated With Large Volume Changes of the Baltic Sea", Adv. Sci. Res., 12, 219-225, 2015, www.adv-sci-res.net/12/219/2015/doi:10.5.194/asr-12-219-2015 (Year: 2015).
Toreti, "A Novel Approach for the Detection of Inhomogeneities Affecting Climate Time Series", Journal of Applied Meteorology and Climatology, vol. 51, Feb. 2012, DOI: 10.1175/JAMC-D-10-05033.1 (Year: 2012).
Zhai, "Spatial Variation and Trends in PDSI and SPI Indices and Their Relation to Streamflow in 10 Large Regions of China", 2010, Journal of Climate, vol. 23, 2010 American Meteorological Society, DOI: 10.1175/2009JCLI2968.1 (Year: 2010).

\* cited by examiner

FIG. 7B

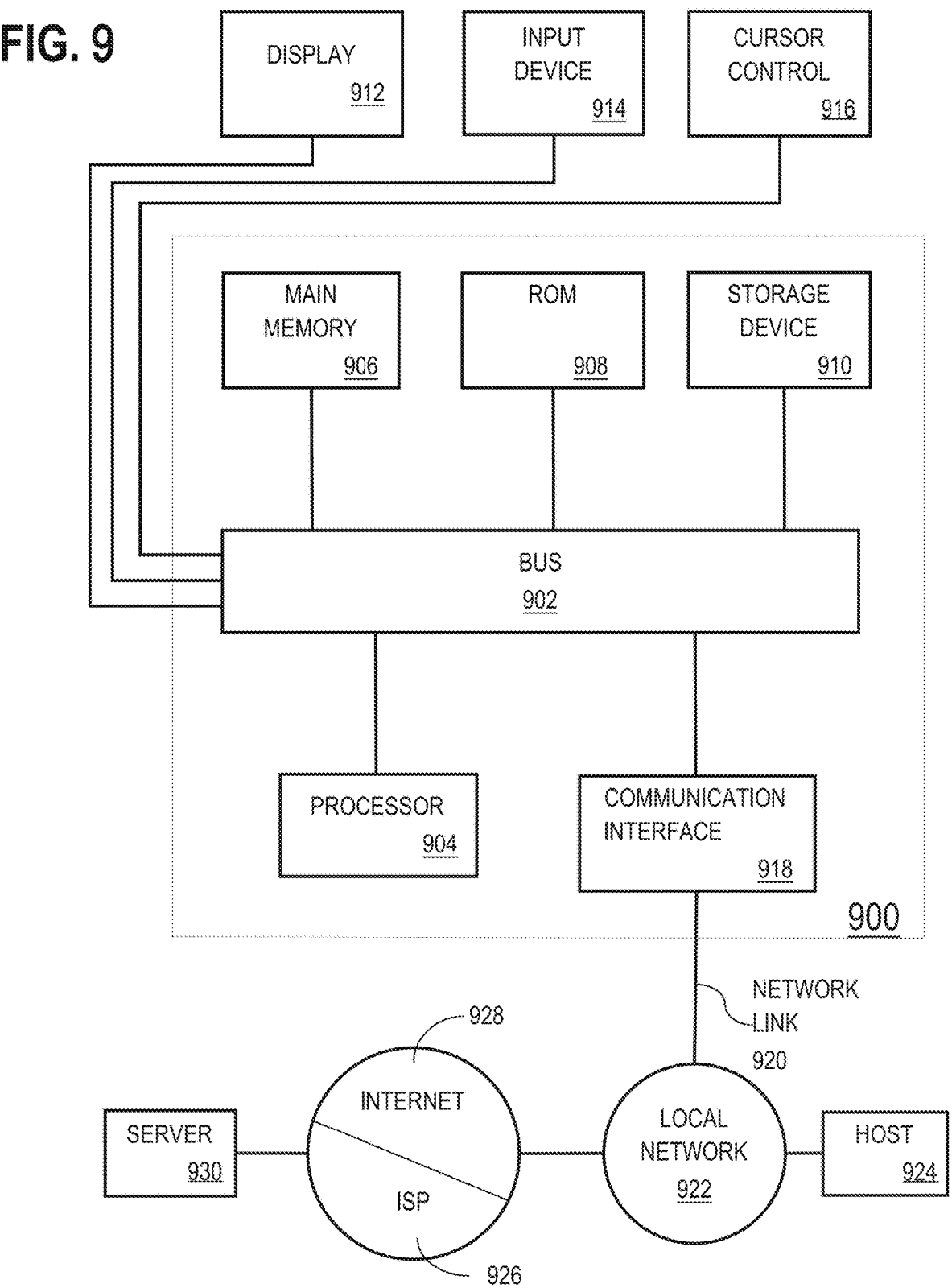

SYSTEMS AND METHODS FOR TRENDING PATTERNS WITHIN TIME-SERIES DATA

BENEFIT CLAIM; RELATED APPLICATIONS

This application claims the benefit of U.S. Provisional Patent Appl. No. 62/301,590, entitled "SEASONAL AWARE METHOD FOR FORECASTING AND CAPACITY PLANNING", filed Feb. 29, 2016, and U.S. Provisional Patent Appln. No. 62/301,585, entitled "METHOD FOR CREATING PERIOD PROFILE FOR TIME-SERIES DATA WITH RECURRENT PATTERNS", filed Feb. 29, 2016, the entire contents for each of which are incorporated by reference herein as if set forth in their entirety.

This application is related to U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS", and U.S. application Ser. No. 15/266,979, entitled "SYSTEMS AND METHODS FOR DETECTING AND ACCOMMODATING STATE CHANGES IN MODELLING", the entire contents for each of which are incorporated by reference herein as if set forth in their entirety.

TECHNICAL FIELD

The present disclosure relates to computer-implemented techniques for generating forecasts. In particular, the present disclosure relates to trending different patterns within a time-series to project future values.

BACKGROUND

Organizations, data analysts, and other entities are often interested in forecasting future values for a time-series signal. In the context of capacity planning, for example, a forecast may be used to determine how many hardware and/or software resources to deploy to keep up with demand. An inaccurate forecast may result in poor capacity planning decisions, leading to an inefficient allocation of resources. For instance, a forecast that underestimates future demand may lead to insufficient hardware and/or software resources being deployed to handle incoming requests. As a result, the deployed resources may be over-utilized, increasing the time spent on processing each request and causing performance degradation. On the other hand, a forecast that overestimates future demand may result in too many resources being deployed. In this case, the deployed resources may be underutilized, which increases costs and inefficiencies associated with maintaining a datacenter environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7B illustrates an example set of temporally weighted data points and pattern trends in accordance with one or more embodiments;

FIG. 9 illustrates an example computer system on which one or more embodiments may be implemented.

DETAILED DESCRIPTION

Figure 1:
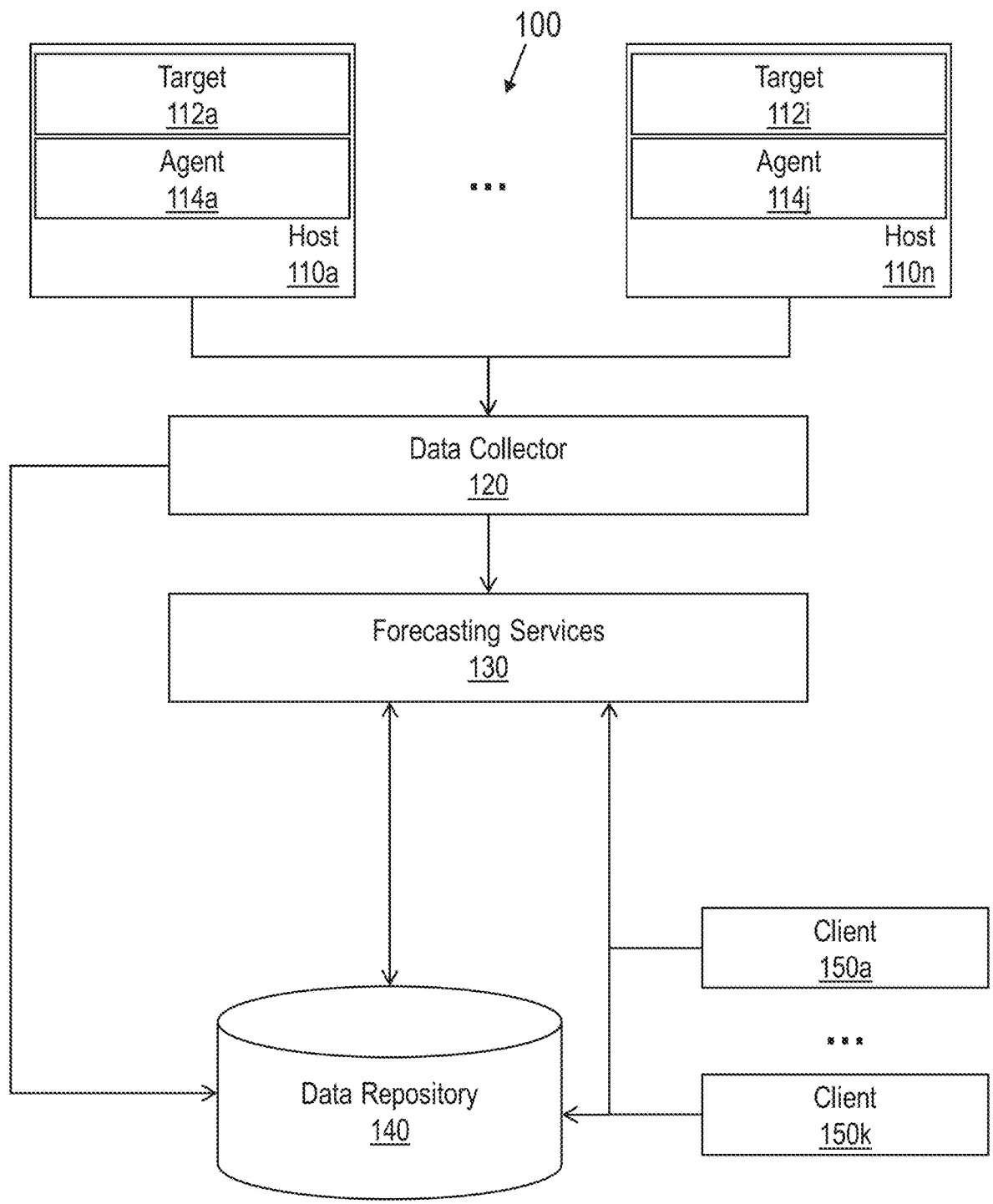
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. FORECAST ANALYTIC OVERVIEW
4. SEASONAL PATTERN DETECTION AND CLASSIFICATION
5. DATA POINT GROUPING BY SEASONAL PATTERN AND COMPONENT
6. PATTERN TRENDING
7. TEMPORALLY WEIGHTED PATTERN TRENDING
8. FORECAST GENERATION

9. FORECAST UNCERTAINTY BASED ON SEASONAL PATTERN CLASSIFICATION
10. SEASONALLY-AWARE CAPACITY PLANNING
11. HARDWARE OVERVIEW
12. MISCELLANEOUS; EXTENSIONS

1. General Overview

A time-series signal may exhibit various behaviors such as seasonal variations in peaks and lows, trends, and/or states. A failure to account for such characteristics may result in unreliable forecasts and, as previously indicated, poor planning decisions. For instance, a middleware administrator in charge of a web-service based application may be responsible for ensuring that there are enough hardware and/or software resources during peak times to satisfy demand. The administrator may plot a trend line using a linear regression model to predict whether current hardware is sufficient for peak months. However, linear regression does not account for seasonal fluctuations in the time-series. In the event that online traffic is greatly reduced in the late evening hours, the linear regression model may underestimate future peak values or overestimate future trough values, both of which lead to a wasteful use of computational resources (including computer hardware, software, storage, and processor resources, and any services or other resources built on top of those resources). Other seasonal factors, such as increased volume around holidays or sales event, as well as non-seasonal factors, such as changes in the state of a signal due to external factors, may also cause the linear regression model to generate inaccurate forecasts.

Rather than relying on linear regression, an administrator may instead use a Holt-Winters forecasting model to account for seasonality in the time-series. The Holt-Winters forecasting model relies on a triple exponential smoothing function to model levels, trends, and seasonality within the time-series. A "season" in this context refers to a period of time before an exhibited behavior begins to repeat itself. The additive seasonal model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + kT_t + S_{t+k-p} \quad (4)$$

where $F_{t+k}$ denotes the forecast at future time t+k.

The additive seasonal model is typically applied when seasonal fluctuations are independent of the overall level of the time-series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + kT_t)S_{t+k-p} \quad (8)$$

Predictive models such as triple exponential smoothing are primarily focused on generating forecasts about future events. While the Holt-Winter additive and multiplicative models take into account seasonal indices to generate the forecast, these models provide limited information on any seasonal patterns that may exist in the time-series data. For instance, the seasonal indices represented by equations (3) and (7) operate within the bounds of the forecasting models to which they are tied. As a result, the seasonal data output by these formulas does not lend itself to meaningful interpretation in contexts outside of the specific forecasting models for which the seasonal data was generated. Further, these seasonal indices are typically implemented as internal structures that are not exposed to the end user. Therefore, the end user may have little or no underlying notion of any of the seasonal patterns that were used to generate a forecast.

Another deficiency with the Holt-Winters models is that they are designed to model time-series with a single seasonal cycle. Many time-series may be more efficiently and accurately represented as multiple seasonal patterns mixed together. For example, a given set of time-series data may have a sparse high signal that trends differently than a dense high signal. By merging both patterns, the forecasting model may project inaccurate values when there are different types of seasonal patterns.

Systems and methods for trending patterns within a set of time-series data are described. In one or more embodiments, a set of one or more groups of data points that are associated with a particular seasonal pattern are generated within volatile and/or non-volatile storage. A set of pairwise slopes is determined for data point pairs within the set of one or more groups of data points. Based, at least in part on the plurality of pairwise slopes, a representative trend rate for the particular seasonal pattern is determined. A set of forecasted values is then generated within volatile or non-volatile storage based, at least in part, on the representative trend rate for the particular seasonal pattern.

The techniques described herein allow different patterns to be trended independently, improving the accuracy of forecasts when patterns trend at different rates. In addition, the use of pairwise slopes to compute the trend rate allows for a robust model in which trends may be more accurately modelled for each individual seasonal pattern. Improved forecasting my lead to enhanced capacity planning, anomaly detection, and other operations within a managed computing system.

2. Architectural Overview

A time series signal comprises a sequence of values that are captured over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

FIG. 1 illustrates an example system for generating forecasts based on time-series data captured by one or more host devices. System 100 generally comprises hosts 110a to 110*n*, data collector 120, forecasting services 130, data repository 140, and clients 150*a* to 150*k*. Components of system 100 may be implemented in one or more host machines operating within one or more clouds or other networked environments, depending on the particular implementation.

Hosts 110*a* to 110*n* represent a set of one or more network hosts and generally comprise targets 112*a* to 112*i* and agents 114*a* to 114*j*. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114*a* to 114*j* comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, etc., that capture time-series measurements of a physical environment and/or resource. Although only one agent and target is illustrated per host in FIG. 1, the number of agents and/or targets per host may vary from implementation to implementation. Multiple agents may be installed on a given host to monitor different target sources of time series data. In other embodiments, an agent that resides remotely on a different host than a target may be responsible for collecting sample time-series data from the target.

Data collector 120 includes logic for aggregating data captured by agents 114*a* to 114*j* into a set of one or more time-series. Data collector 120 may store the time series data in data repository 140 and/or provide the time-series data to forecasting services 130. In one or more embodiments, data collector 120 receives data from agents 114*a* to 114*j* over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Forecasting services 130 includes a forecasting analytic or set of analytics that may be invoked to process time-series data. For instance, forecasting services 130 may include logic for detecting and classifying seasonal behaviors within such as described in U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", the entire contents for each of which were previously incorporated by reference herein as if set forth in their entirety. In addition or alternatively, forecasting services 130 may include logic for generating forecasts and accommodating state changes in a forecast, such as described in U.S. application Ser. No. 62/301,590, entitled "SEASONAL AWARE METHOD FOR FORECASTING AND CAPACITY PLANNING"; and/or U.S. application Ser. No. 15/266,979, entitled "SYSTEMS AND METHODS FOR DETECTING AND ACCOMMODATING STATE CHANGES IN MODELING", the entire contents for each of which were previously incorporated by reference herein as if set forth in their entirety.

Data repository 140 includes volatile and/or non-volatile storage for storing data that is generated and/or used by forecasting services 130. Example data that may be stored may include, without limitation, time-series data collected, seasonal pattern classifications, data point groupings, pattern trend rate and intercept data, and forecast data. Data repository 140 may reside on a different host machine, such as a storage server that is physically separate from forecasting services 130, or may be allocated from volatile or non-volatile storage on the same host machine.

Clients 150*a* to 150*k* represent one or more clients that may access forecasting services 130 to generate forecasts and/or perform capacity planning operations. A "client" in this context may be a human user, such as an administrator, a client program, or some other application instance. A client may execute locally on the same host as analytic services 130 or may execute on a different machine. If executing on a different machine, the client may communicate with forecasting services 130 via one or more data communication protocols according to a client-server model, such as by submitting HTTP requests invoking one or more of the services and receiving HTTP responses comprising results generated by one or more of the services. Forecasting services 130 may provide clients 150*a* to 150*k* with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

3. Forecast Analytic Overview

In one or more embodiments, forecasting services 130 receives, as input, a time-series signal and forecasting parameters, such as a start time and/or duration of the forecast. In response, forecasting services 130 outputs a set of forecasted values in accordance with the forecasting parameters. As an example, a client may request a forecast for CPU usage on a given host over the next three months. In response, forecasting services 130 may analyze a historical set of time-series data that tracks CPU usage on the host. As discussed further herein, the analysis may include, without limitation detecting seasonal patterns within the historical set of time-series data and trending the detected seasonal patterns, if any. Based on the analysis a set of forecasted values the project CPU usage over the next three months is generated. A chart, graphical interface, or other display may be generated based on the forecasted values to allow a user to quickly visualize the projected values.

Figure 2:
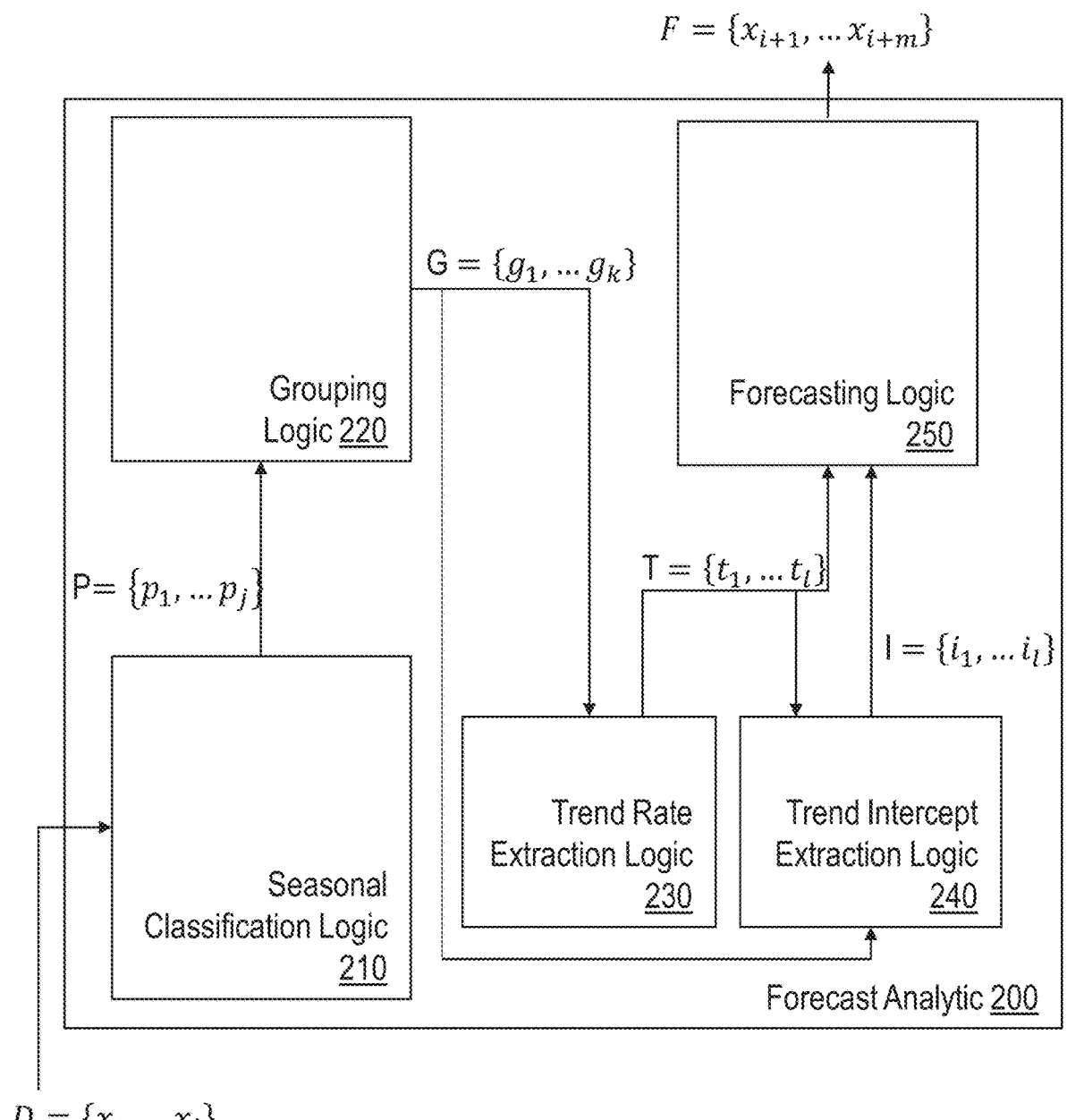
FIG. 2 illustrates an analytic for generating forecasts based on seasonal pattern trending in accordance with one or more embodiments.

Referring to FIG. 2, analytic for generating forecasts based on seasonal pattern trending in accordance with one or more embodiments. Forecast analytic 200 generally comprises pattern classification logic 210, grouping logic 220, trend rate extraction logic 230, pattern intercept extraction logic 240, and forecasting logic 250. Each logic unit may comprise hardware and/or software logic to perform a specialized set of operations as described further herein. Further, although individual logic units are shown and described as performing specific operation, in some embodiments, the operations may be merged into a single logic unit or split across multiple logic units.

Pattern detection logic 210 receives, as input, a set of time-series data denoted D, which captures a sequence of values $\{x_1, \ldots x_i\}$. Pattern detection logic 210 processes the set of time-series data D to detect and classify a set of seasonal patterns, denoted P, which includes pattern identification information $\{p1, \ldots pj\}$ for each detected seasonal pattern. In one or more embodiments, the pattern identification information identifies the different components of a seasonal pattern. A "component" in this context refers to a portion of the seasonal pattern that corresponds to a sub-period within the seasonal period. In the context of a weekly high seasonal pattern, for instance, the components may correspond to the days, hours, or other sub-periods of a week that have been classified as weekly highs. In one or more embodiments, pattern detection logic 210 may implement the techniques described in U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", to detect and classify seasonal patterns.

Grouping logic 220 receives the set of pattern identification information and, in response, generates, within volatile and/or non-volatile storage, a set of one or more groups of data points, denoted, G. In one or more embodiments, the data points are grouped by seasonal pattern classification and/or components. As an example, a first group for seasonal highs may include sample data points from samples of different Mondays between 9 and 10 a.m., a second group may include sample data points from the different Mondays between 10 and 11 a.m., etc. Thus, a group may correspond to a respective sub-period within a season and comprise data points from different instances of the sub-period.

Trend rate extraction logic 230 receives the set of one or more groups of data points as input and analyzes the groups according to seasonal pattern classification. Based on the analysis, trend rate extraction logic 230 generates, within volatile or non-volatile storage, a set of one or more representative trend rates, denoted T, for the respective seasonal patterns that were detected. The representative trend rate for one seasonal pattern may differ from another seasonal pattern depending on the analysis. For instance, the trend rate for sparse highs may be negative while the trend rate for sparse highs may be positive or vice versa. Thus, the direction and/or magnitude of the trend rate may vary between different seasonal patterns.

Trend intercept extraction logic 240 also receives the set of one or more groups of data points as inputs and analyzes the groups according to seasonal pattern classification. Based on the analysis, trend intercept extraction logic 240 generates, within volatile or non-volatile storage, a set of one or more trend intercepts (also referred to as "anchor point"), denoted T, for the respective seasonal patterns that were detected. The trend intercept in this context refers to the point at which a trend line crosses the y-axis, where the y-axis corresponds to the values of a metric at the beginning of a seasonal period. In the context of resource usages, such as the number of active sessions in a database server, the intercept may correspond to resource usage at the beginning of a seasonal period. A trend line may be plotted as $T_n = t x_n + i$, where $T_n$ is the value on a trend line for the nth sample $x_n$, t is the representative trend rate for a seasonal pattern, and i is the trend intercept or "anchor point".

Forecasting logic 250 receives the set of trend rates and trend intercepts as input. Forecasting logic 250 uses the trend rates and intercepts to train a forecasting model and outputs a set of forecast data denoted F. The forecasting model may trend samples from different seasonal pattern independently. For example, seasonal highs may be trended independently of seasonal lows, sparse highs may be trended independently of dense highs, etc. By analyzing different seasonal patterns separately, more accurate forecasts may be achieved when the seasonal patterns trend in a different way.

Figure 3:
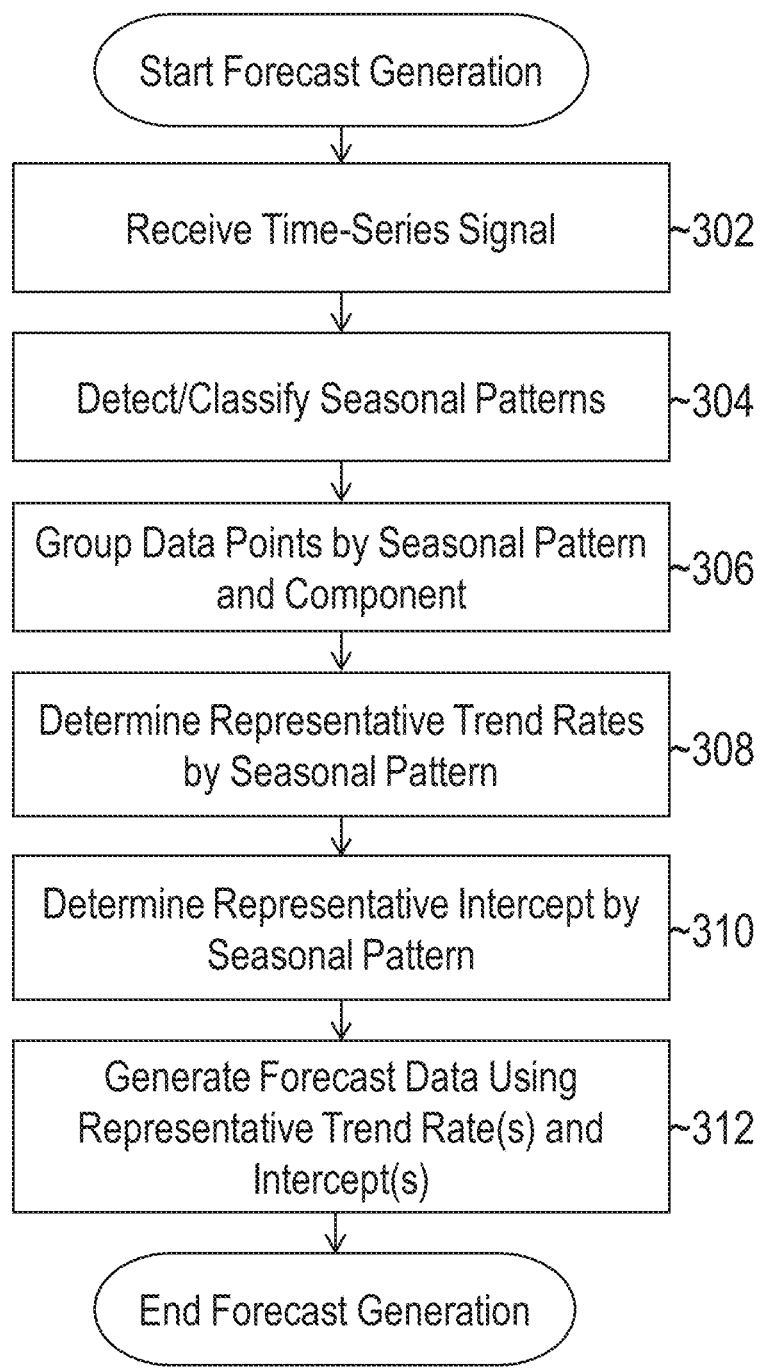
FIG. 3 illustrates an example set of operations for generating a forecast based on seasonal pattern trending in accordance with one or more embodiments.

With reference to FIG. 3, an example set of operations for generating a forecast based on seasonal pattern trending is illustrated in accordance with one or more embodiments. At 302, the process receives a time-series signal that includes a sequence of values that measure an attribute associated with one or more targets over time. For example, the time-series signal may measure CPU usage, memory bandwidth, database logons, active sessions within a database system or other application, and any other hardware or software resource metric.

At 304, the process detects and classifies seasonal patterns within the set of time-series data. For instance, the process may implement the techniques described in U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; and/or U.S. application Ser. No. 15/057,062, entitled "UNSUPERVISED METHOD FOR CLASSIFYING SEASONAL PATTERNS", to detect and classify seasonal patterns.

At 306, the process groups data point by seasonal pattern and component. A "component" of a seasonal pattern corresponds to a sub-period within a season that may be independently analyzed. As an example, a component group may organize data points that belong to the same sub-period of different instances of a week and that are associated with the same seasonal class. For a given seasonal pattern, a plurality of component groupings may be generated, with each group corresponding to and organizing data points from different sub-periods of a season.

At 308, the process determines representative trend rates by seasonal pattern classification. As will be discussed further below, the representative trend rate for a seasonal pattern may be determined, based at least in part, on an analysis of data point pairs within the one or more component groups that are associated with the seasonal pattern. For example, the representative pairwise trend rate may be selected within a median range that is determined from a set of pairwise trend rates that are computed for the data point pairs.

At 310, the process determines representative trend intercepts by seasonal pattern classification. Similar to the representative trend rate, the representative trend intercept for a seasonal pattern may be determined, based at least in part on an analysis of data points within the one or more component groups that are associated with the seasonal pattern. For example, the representative intercept may be selected within a median range that is determined from a set of intercepts that are computed for each data point.

At 312, the process generates forecast data using the representative trends rates and intercepts for the different seasonal patterns. The process may train a forecasting model to trend samples from different seasonal pattern independently using the trend rates and intercepts determined at 306 and 308, respectively. By trending patterns independently, the accuracy of forecasted values that are associated with each seasonal patter may be improved.

4. Seasonal Pattern Detection and Classification

Seasonal classification logic 210 may analyze seasons of a single duration or of varying duration to detect seasonal patterns. As an example, the time-series data may be analyzed for daily patterns, weekly patterns, monthly patterns, quarterly patterns, yearly patterns, etc. The seasons that are analyzed may be of user-specified duration, a predefined duration, or selected based on a set of criteria or rules. If a request received from a client specifies the length of the season as L periods, for instance, then seasonal analytic logic 210 analyzes the time series data to determine whether there are any behaviors that recur every L periods. If no patterns are detected, then seasonal classification logic 210 may generate an output to indicate that no patterns were detected. On the other hand, if seasonal analytic logic 210 identifies one or more seasonal patterns, then the detected patterns may be classified according to techniques described in further detail below.

The manner in which seasonal patterns are identified and classified may vary depending on the particular implementation. Example classifications may include, but is not limited to, seasonal highs, seasonal lows, seasonal sparse highs, seasonal sparse, lows, seasonal dense highs, and seasonal dense lows. A feature/pattern is considered sparse if its duration within a season is less than a threshold thereby indicating that the exhibited behavior is an outlier. Sparse features generally manifest as an isolated data point or as a small set of data points that are far removed from the average data point within the time-series. Conversely, a feature/pattern may be considered dense if its duration within a season satisfies the threshold (e.g., falls within the threshold or is higher than the threshold), indicating that the exhibited behavior is not an outlier. In some embodiments, a dense signal represents a plurality of instances of time-series data that (1) significantly represents an entire period or sub-period of data and (2) exclude a relatively small portion (e.g., 1%, 5%, or some other threshold) of the data as outliers that are not the subject of the fitted signal. A sparse signal may represent data points that are excluded from the dense class of data points as outliers. For example, a dense signal may approximate a seasonal period or sub-period of a time series by, for each time increment in the time series, approximating the data point that is, over multiple historical instances of the time increment in multiple historical instances of the time series, average, most likely, most central, has the least average distance, or is otherwise a fit or best fit for the multiple historical instances of the time increment. In one embodiment, if there is no single data point that can approximate, with a certain level of confidence or significance, a particular time increment, that time increment can be classified as not having a dense signal.

There are many possible causes of a sparse signal within a set of time series data. As an example, a sparse signal may correspond to a sudden surge (a sparse high) or drop-off (a sparse low) in the usage of a particular target resource. In some instances, the sparse signal may be noise, such as activity cause by an anomalous event. In other instances, a surge or drop-off may be caused by a recurrent seasonal event, such as a periodic maintenance operation.

For a given set of time series data, a noise signal may have a magnitude that dominates that of a smaller dense pattern. Without a separate treatment of sparse and dense features in the time series data, a dense pattern may potentially be overlooked due to the magnitude of the overlaid noise. In order to prevent the dense pattern from going unclassified, the noise/sparse data may be isolated from the dense data within a time series. Separate processing for the sparse and dense features of a time series may then be provided when performing classification and forecasting.

In some embodiments, a time series is decomposed into a noise signal and a dense signal where the noise signal, also referred to herein as a sparse signal or sparse component, captures the sparse distribution of data in a time series that otherwise has a dense distribution and the dense signal, also referred to herein as the dense component, captures the dense distribution of data, removing the noise signal. The manner in which a set of time series data is decomposed into a sparse component and dense component may vary depending on the particular implementation. In some embodiments, the dense component may be obtained from the seasonal factors of an Additive Holt-Winters model. As previously indicated, the Holt-Winters model employs triple exponential smoothing to obtain the seasonal index. The applied smoothing, in effect, removes the sparse component of the original time series signal. The result is a time series that includes the dense features of the original time series. While the Additive Holt-Winters model may be used to generate a dense signal for a time series, in other embodiments, other techniques, such as other localized averaging or smoothing functions, may be used to obtain the dense signal. Once the dense component has been generated and stored, the noise component may be determined by taking the original set of time series data and subtracting out the dense component from the original signal. The resulting noise signal is a time series that includes the noise features from the original time series.

Figure 4A:
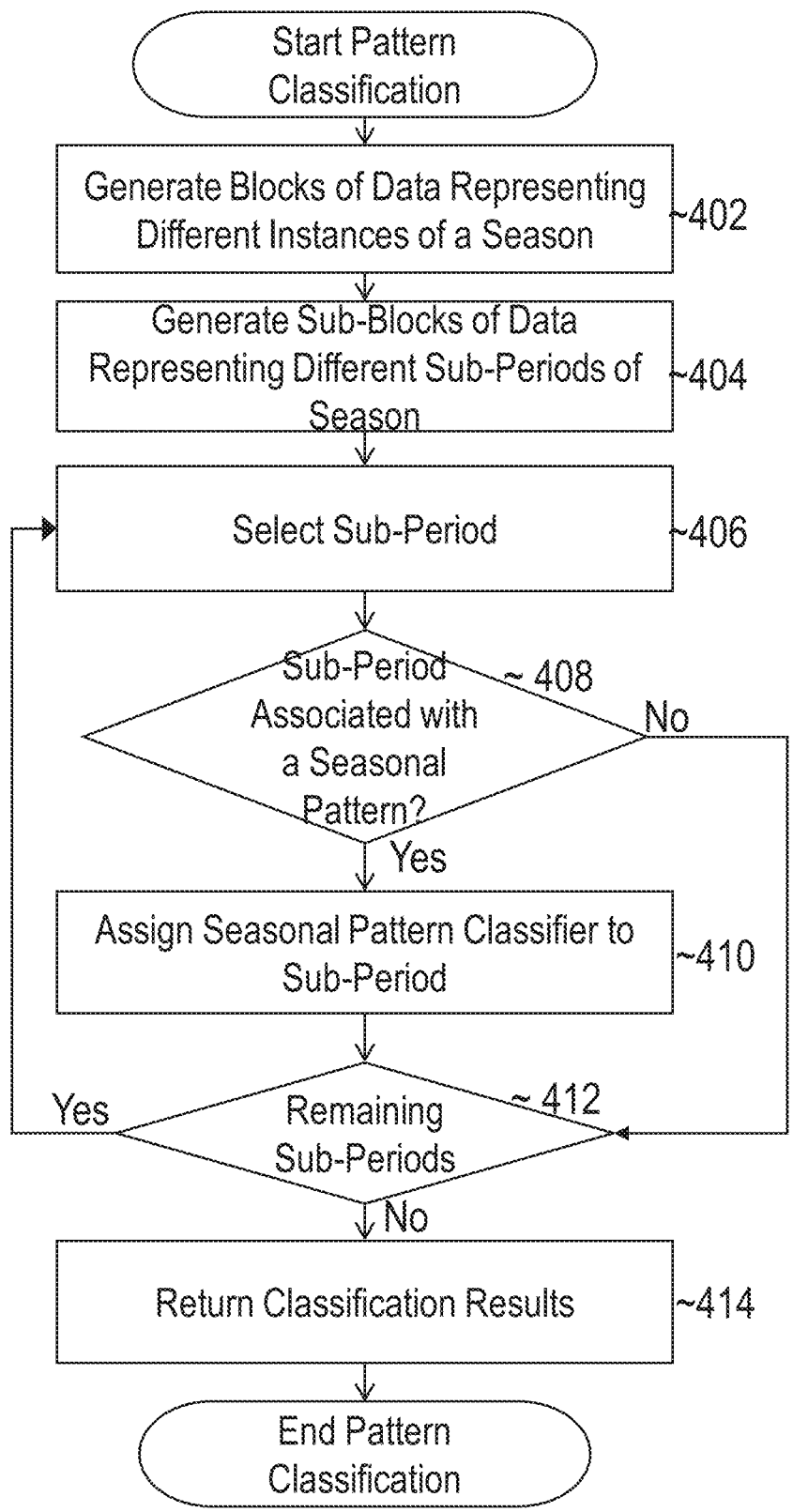
FIG. 4A illustrates an example set of operations for classifying seasonal patterns in accordance with one or more embodiments.

Referring to FIG. 4A, an example set of operations for classifying seasonal patterns is illustrated in accordance with one or more embodiments. At 402, the time-series data is preprocessed by generating blocks of data, where each block of data represents a respective instance of a season within the time series and includes data from the time series that spans a time period of the seasonal duration. As an example, if a time series includes data spanning twenty-five weeks and the length of a season is one week of time, then the time-series data may be chunked into twenty-five blocks, where the first block includes data points collected during the first week, the second block data points collected during the second week, etc.

At block 404, the process generates, for each block of data, a set of sub-blocks, where each sub-block of data represents one instance of a season and includes time-series data spanning a sub-period of a particular duration. The duration of the sub-period may vary from implementation to implementation. As an example, for a weekly season, each sub-period may represent a different hour of time within the week. Thus, a block representing a full week of data may be segmented into one hundred and sixty-eight sub-blocks representing one-hundred and sixty-eight different sub-periods. If a sub-period is defined as representing two hours instead, then a block representing a week may be segmented into eighty-four sub-blocks. As another example, for a monthly season, a sub-period may correspond to one day of the month. A block representing one month may then be segmented into twenty-eight to thirty-one sub-blocks, depending on the number of days in the month. Other sub-periods may also be selected to adjust the manner in which time series data are analyzed and summarized.

At 406, the process selects a sub-period of the season to analyze and determine how it should be classified. The process may select the first sub-period of a season and proceed sequentially or select the sub-periods according to any other routine or criteria.

At 408, the process determines whether and how to classify the selected sub-period of the season based, in part, on the time-series data collected for one or more instances of the season. In the context where a particular sub-period represents the first hour of the week, for example, the process may collect data points from the first hour of each instance of the week. If there are twenty-five weeks, then twenty-five data points may be collected, with one corresponding to the first hour of each separate week. The process may compare the data points representing the first hour of every week against time series data for the remaining part of the week to determine how to classify the particular sub-period. If a recurrent pattern is detected, then the process continues to block 410. Otherwise the process continues to block 412.

At block 410, the process associates the selected sub-period of the season with a class of seasonal pattern. If a seasonal pattern of highs is detected, for instance, then the instance may be associated with a corresponding class representing recurrent seasonal highs. Similarly, the sub-period may be associated with a class representing recurrent seasonal lows if the process detects a recurrent low pattern from the time series data within the associated sub-blocks. In other embodiments, the respective instance may be associated with different seasonal patterns depending on the recurrent patterns detected within the sub-blocks. To associate a sub-period with a particular seasonal class, the process may update a bit corresponding to the sub-period in a bit-vector that tracks which sub-periods are associated with the seasonal class.

In some cases, the process may not be able to associate a selected sub-period with a class of seasonal pattern. This may occur, for instance, if the sample data points for the corresponding sub-period do not follow a clear recurrent pattern across different seasonal periods. In this scenario, the process may leave the sub-period unclassified. When a sub-period is left unclassified, the process may simply proceed to analyzing the next sub-period of the season, if any, or may update a flag, such as a bit in a bit-vector, that identifies which sub-periods the process did not classify in the first pass.

At block 412, the process determines whether there are any remaining sub-periods of the season to analyze for classification. If there is a remaining sub-period of the season to analyze, then the process selects the next remaining sub-period of the season and returns to block 406 to determine how to classify the next sub-period. Otherwise, the process continues to block 414.

At block 414, the process returns a set of classification results based on the analysis performed in the previous blocks. The classification results may vary from implementation to implementation and generally comprise data that identifies how the sub-periods of a season have been classified. As an example, for a given sub-period, the classification results may identify whether the given sub-period is a sparse high, dense high, a seasonal low, or has been left unclassified. Unclassified sub-periods may subsequently be classified based on further analysis. For instance, a homogenization function may be applied to classify these sub-periods based on how adjacent sub-periods in the season have been classified as described in U.S. application Ser. No. 15/057,065, entitled "SYSTEM FOR DETECTING AND CHARACTERIZING SEASONS".

Figure 4B:
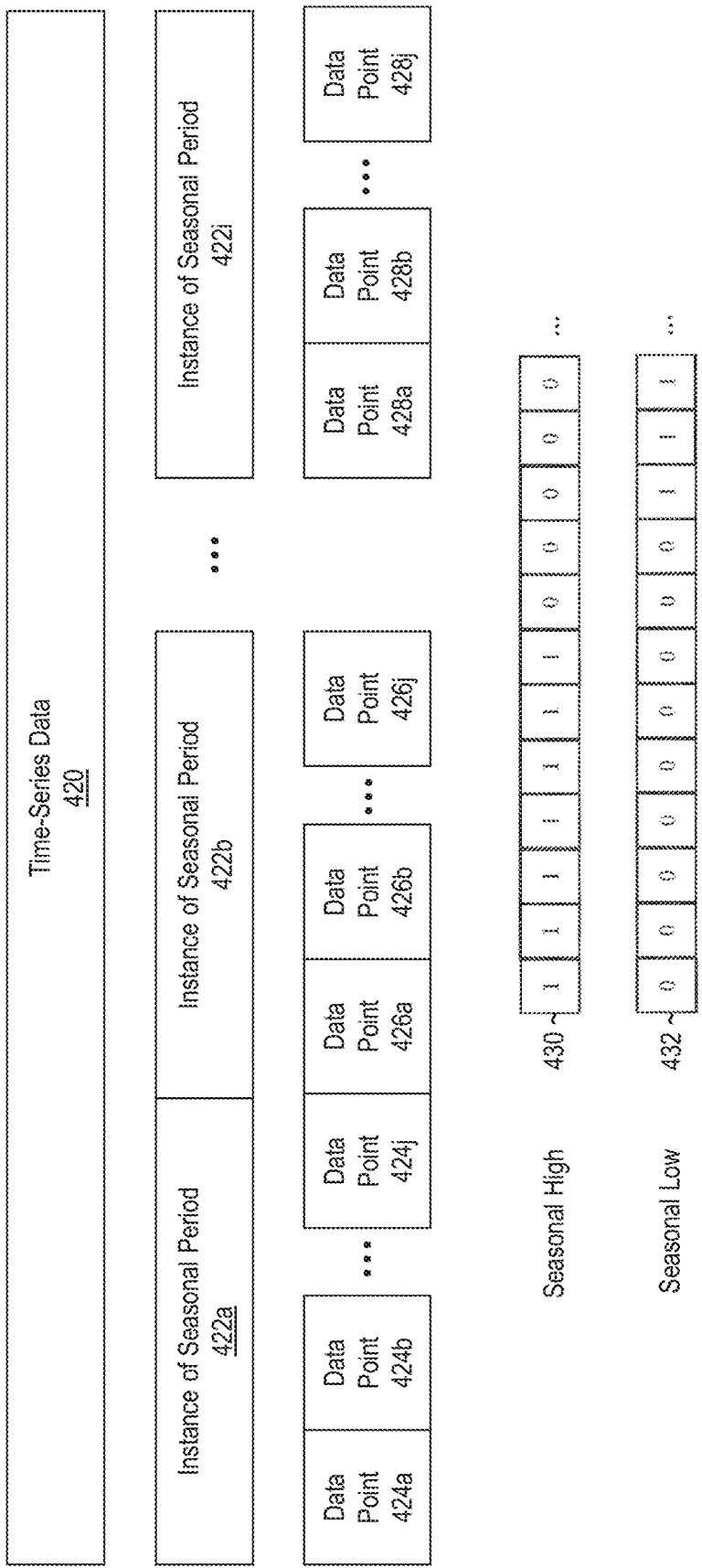
FIG. 4B illustrates an example set of classification results for a seasonal pattern classification in accordance with one or more embodiments.

In some embodiments, the classification of a set of instances may be stored as a set of one or more bit-vectors (also referred to herein as arrays). Referring to FIG. 4B, for instance, it depicts an example classification for instances of a season detected within a set of time series data. To obtain the classification results, time series data 420 is chunked into a plurality of blocks including 422a, 422b, and 422n, where each block contains data for a different instance of a season. Each of seasonal samples 422a, 422b, and 422n is further chunked into sub-blocks based on the sub-period sample size. Block 422a is chunked into to sub-blocks including data point 424a, 424b, and 424j, block 424b is chunked into sub-blocks containing data point 426a, 426b, and 426j, and block 422i is chunked into sub-blocks containing data point 428a, 428b, and 428j. In the context of a weekly season, each sub-block may represent one week of time series data, and each sub-block may contain a data point representing a metric value for a one-hour sub-period within the week. The blocks may represent other seasonal durations and/or the sub-blocks may represent other sub-periods, depending on the particular implementation.

A set of bit-vectors classify the sub-periods of the season may be generated based on an analysis of the data points. The bit-vectors that are illustrated in the present example include bit-vector 430, which represents a first class for seasonal highs, and bit-vector 432, which represents a second class for seasonal lows. Other bit-vectors may also be generated to represent different seasonal pattern classifications such as sparse high, sparse low, etc., depending on the particular implementation. Different bits within a bit-vector correspond to different sub-periods of a season and act as a Boolean value indicating whether the corresponding sub-period is associated with a class or not. For instance, the first seven bits may be set to "1" in bit-vector 430 and "0" in bit-vector 432 to indicate that the first seven sub-periods of the season represent seasonal highs. A subsequent sequence of bits may be set to "0" in both bit-vector 430 and bit-vector 432 to indicate that the corresponding sub-periods of the season are unclassified. Similarly, a subsequent sequence of bits may be set to "0" in bit-vector 430 and "1" in bit-vector 432, to indicate that the corresponding sequence of sub-periods of the season are a low season The length of a bit-vector may vary depending on the number of sub-periods within a season. In the context of a week-long season, for instance, bit-vectors 430 and 432 may each store 168 bits representing one hour sub-periods within the season. However, the bit-vectors may be shorter in length when there are fewer sub-periods in a season or longer in length when a greater number of sub-periods are analyzed. This allows flexibility in the granularity by which sub-periods are analyzed and classified.

5. Data Point Groupings by Seasonal Pattern and Component

Once data points within the set of time-series data D have been classified, grouping logic 220 may leverage the classifications to generate a set of one or more groups of data points for each seasonal pattern. A group in this context may be generated using a data structure that organizes and associates data points that have been assigned to the same group. Example data structures may include, without limitation, linked lists, arrays, hash tables, data point mappings, and tree structures. Grouping data points by seasonal class and component facilitates independent processing of seasonal patterns by a computing system.

Figure 5A:
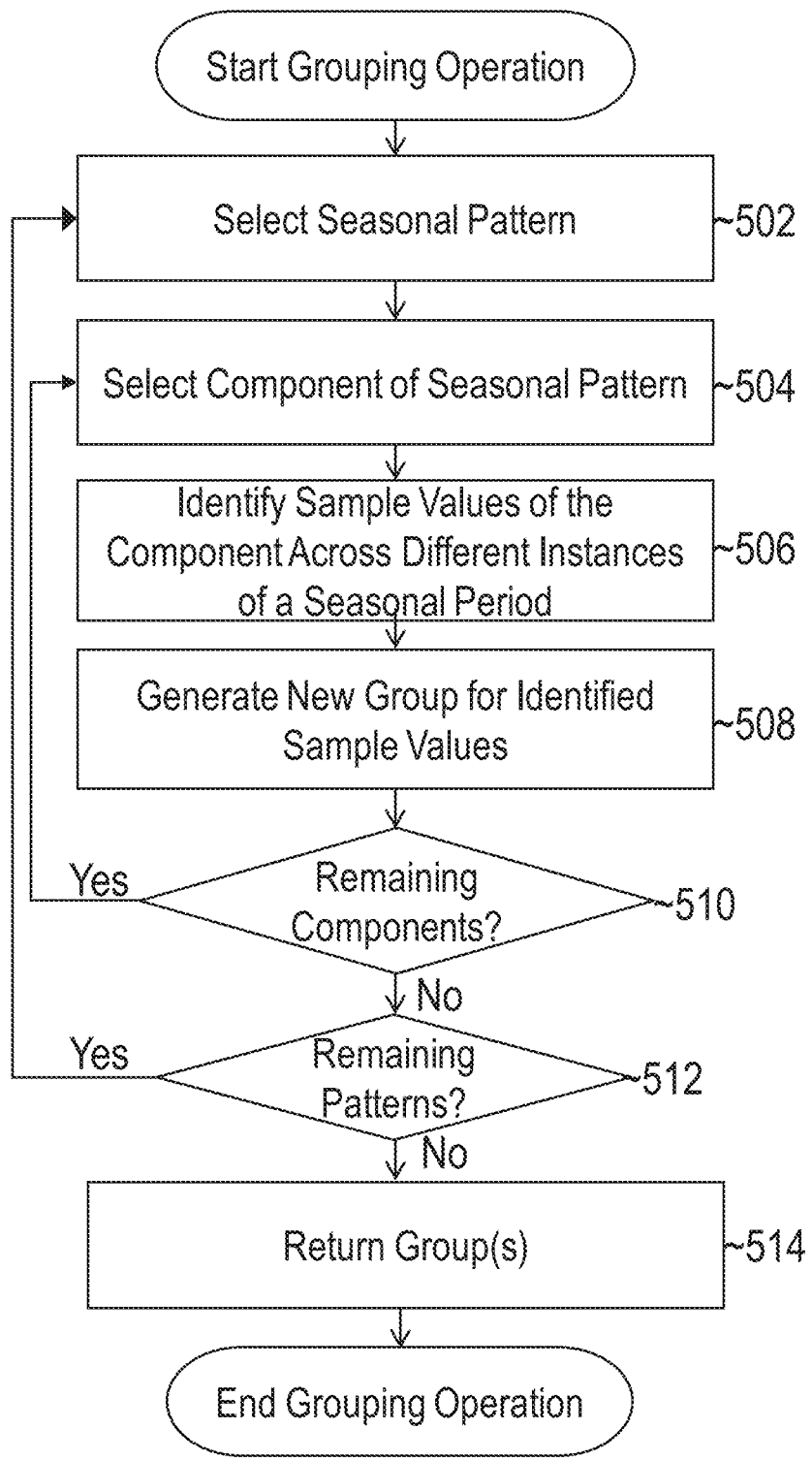
FIG. 5A illustrates an example set of operations for grouping data points by seasonal pattern and component in accordance with one or more embodiments.

Referring to FIG. 5A an example set of operations for grouping data points by seasonal pattern and component are illustrated in accordance with one or more embodiments. At 502, the process selects a seasonal pattern from the set of seasonal patterns P. For instance, if data points have been classified into three separate categories, sparse highs, dense highs, and lows, the process may select sparse highs or one of the other seasonal patterns to begin.

At 504, the process selects a component of the seasonal pattern. In the example where a sparse high is selected, for instance, Mondays from 9 a.m. to 12 p.m. may have been classified as sparse highs. In this case, assuming sample rates of an hour, the sparse high would include three separate components corresponding to different sub-periods of a season: a first component corresponding to 9 a.m. to 10 a.m., a second component corresponding to 10 a.m. to 11 a.m., and a third component corresponding to 11 a.m. to 12 p.m. The process may start by selecting the earliest sub-period or may analyze components in any other order.

At 506, the process identifies sample values for the selected component across different instances of a seasonal period. In the example where Monday at 9 a.m. is selected, the process may identify a sample values for this sub-period across multiple weeks of time-series data. For example, if there are four weeks of data where Monday at 9 a.m. has been classified as a sparse high, then four sample values may be identified and collected for the selected component of the sparse high seasonal pattern.

At 508, the process generates a new component group for the identified sample values. As previously mentioned, the group may be a data structure that organizes, maps, and/or otherwise associates the identified sample values for the selected component of the seasonal pattern.

At 510, the process determines whether there are any remaining components. In one or more embodiments, the process may analyze the set of pattern identification data in order to determine whether there are remaining components. In the example where the pattern identification data indicates that Monday at 9 a.m. to 12 p.m. is a sparse high and Monday at 9 a.m. to 10 a.m. was initially selected, the process may return to 504 and select the next sample (e.g., Monday from 10 a.m. to 11 a.m.) that has been classified as a sparse high. The process then repeats 506 and 508 for the next component. Once there are no remaining components in the seasonal pattern, the process continues to 512.

At 512, the process determines whether there are any remaining seasonal patterns. In the example where there are three seasonal patterns (sparse high, dense high, and low) and the process begins with the sparse high, the process may then return to 502 and select the seasonal pattern classified as dense high or low to analyze. The process then repeats and generates a set of one or more groups of data points for each seasonal pattern. Once there are no remaining seasonal patterns, the process continues to 514.

At 514, the process returns handles for the groups that were generated within volatile and/or non-volatile storage. The forecasting analytic may use the handle to reference and access the groups within memory or other storage during the operations described in further detail below.

Figure 5B:
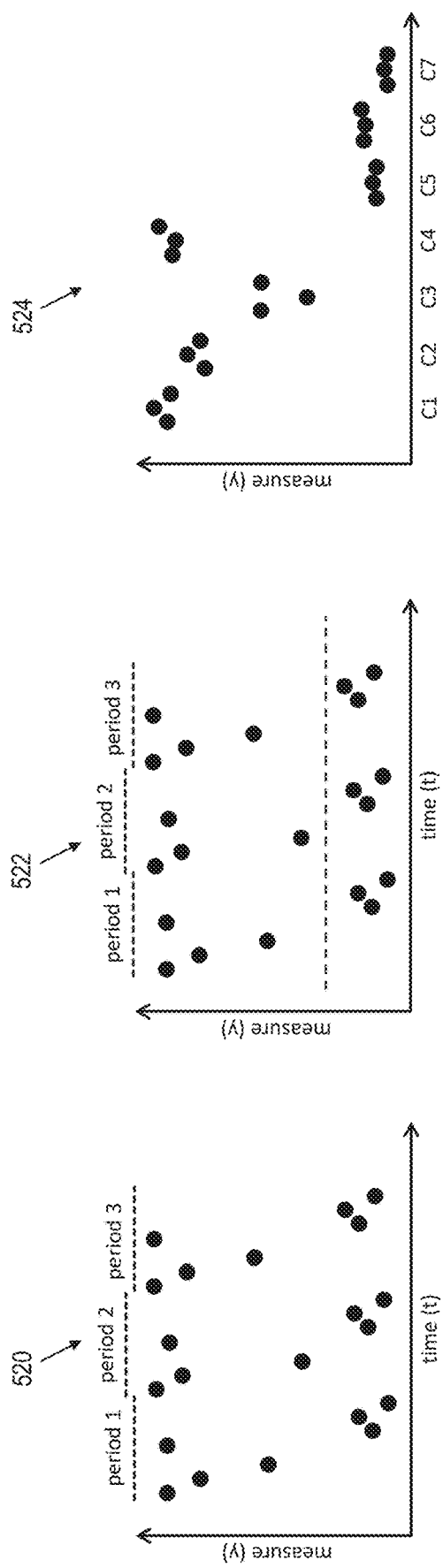
FIG. 5B illustrates an example set of grouping results in accordance with one or more embodiments.

FIG. 5B illustrates an example set of grouping results in accordance with one or more embodiments. Chart 520 depicts an example set of time-series data that spans three instances (or cycles) of a season. The period of the season may vary depending on the particular implementation.

Chart 522 depicts an example result of detecting and classifying seasonal patterns within the set of time series. Specifically, the data points that are above the dotted line have been classified as seasonal highs, and the data points that occur below the dotted line are classified as seasonal lows.

Chart 524 depicts the results of grouping the data points by seasonal pattern and components. The first four groups, C1, C2, C3, and C4 group sample data points for the seasonal high pattern. Group C1 groups data points from the first sub-period associated with the seasonal pattern, group C2 group data points from the second sub-period, etc. The next three groups, C5, C6, and C7, group data points for the seasonal low pattern. Group C5 groups the first sub-period that has been classified as a seasonal low, group C6 the second sub-period, and group C7, the third.

6. Pattern Trending

Once the data points have been organized by seasonal class and component, trend rate extraction logic 230 and/or trend intercept extraction logic 240 analyzes the groups to generate trend data for the seasonal components and seasonal patterns. In one or more embodiments, trend rate extraction logic 230 generates a representative trend rate for each seasonal pattern, and trend intercept extraction logic 240 generates a representative trend intercept for each seasonal pattern. For instance, if four seasonal patterns have been detected (e.g., sparse high, sparse low, dense high, dense low), a separate trend rate and intercept may be computed for each seasonal pattern Thus, samples associated with each seasonal pattern may be trended independently.

In order to determine the trend rate and intercept of each seasonal pattern, trend rate extraction logic 230 may perform a pairwise analysis of the sample data points that are associated with each seasonal pattern. In one or more embodiments, a Theil-Sen estimator may be applied to the data points in order to compute a representative trend rate and intercept. A Theil-Sen estimator in this context computes or approximates the median slope among all lines through each data point pair that is associated with a seasonal pattern. The median slope is classified as the representative tend rate. Once the median slope m has been determined, a line with slope m may be plotted through each data point in the seasonal pattern. The representative intercept may then be selected as the median of the intercept values.

As an alternative to the Theil-Sen estimator, which computes the slope for all possible data point pairings, the set of data point pairs for which a slope is computed may be restricted to component groupings. Put another way, the Theil-Sen estimator considers all unique sample pairs within a seasonal pattern, while a modified estimator may constrain the pairs to be within the same pattern component such that each pair is separated by n seasonal periods where n is a positive integer. One advantage of this modification is that instead of getting slopes for all data point pairs, the process generates a slope across a pattern's components and thereby an estimate of the stability of the pattern itself. In addition, because the number of data point pairings for which a slope is computed is reduced, the processing overhead involved in computing a representative slope and intercept may also be significantly reduced.

The grouping and pattern trending techniques further allow for each seasonal pattern component to be independently analyzed. As an example, a component grouping for Monday, 9 a.m. to 10 a.m. may have slopes computed for all data point pairs for this sub-period separated by one or more seasonal cycles. A second component grouping for Monday 10 a.m. to 11 a.m. includes data points for the same seasonal pattern that fall within this sub-period. In this example, the data point pairings are not created using data points from separate groups to constrain the number of data point pairs for which slopes are generated. This constraint facilitates an independent analysis for each component groups of the seasonal pattern. Thus, the trend for the first hour of a seasonal pattern may be compared to the trend of a second seasonal pattern, which may be compared to a third hour and so on. In this way, outliers may be quickly identified and processed. The representative slope may then be selected as the median slope of the set of slopes computed for each group in the seasonal pattern.

Figure 6A:
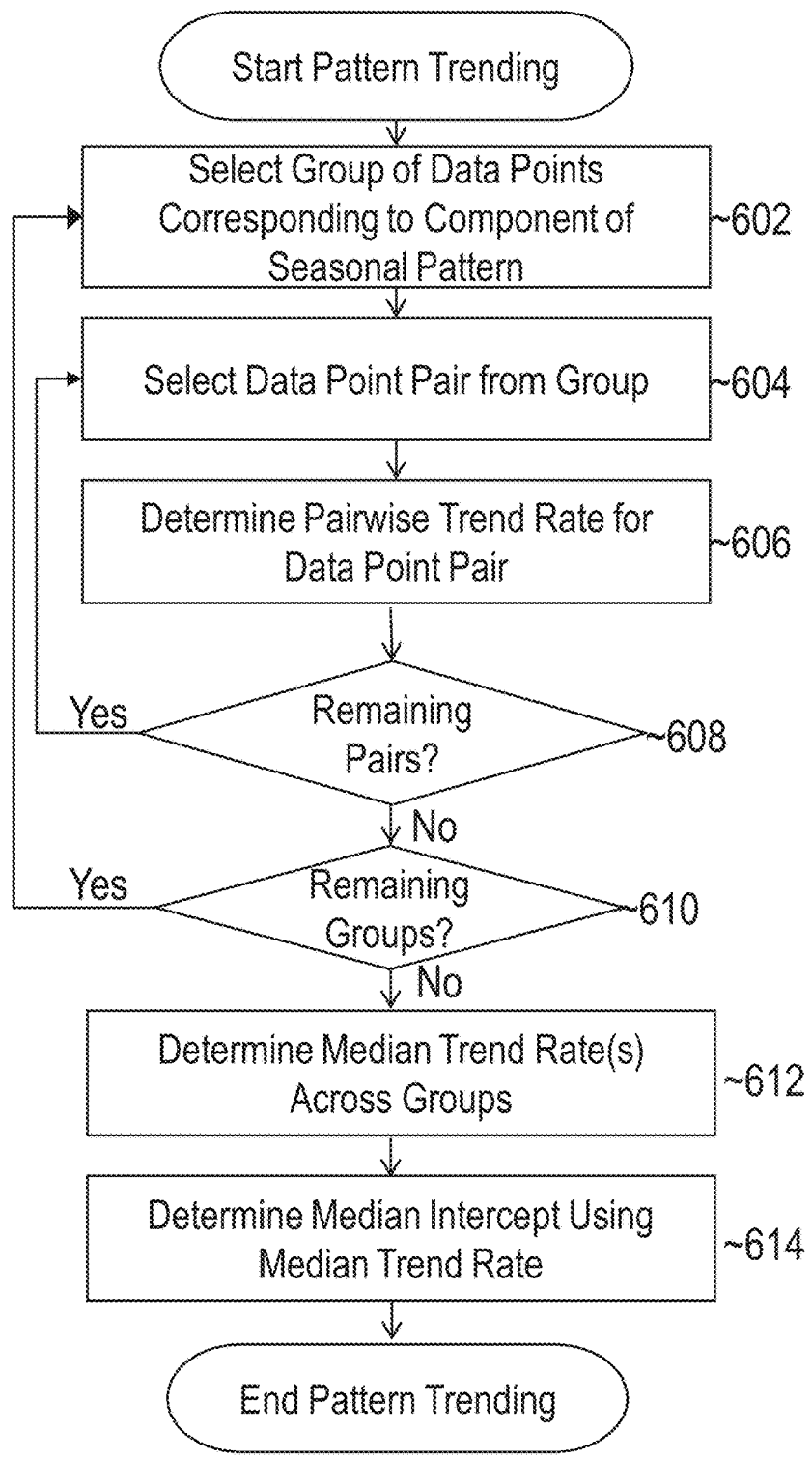
FIG. 6A illustrates an example set of operations for determining a representative trend rate and intercepts for a set of seasonal patterns in accordance with one or more embodiments.

Referring to FIG. 6A, an example set of operations for determining a representative trend rate and intercept for a selected seasonal patterns is illustrated in accordance with one or more embodiments. At 602, the process selects a group of data points for a component of the seasonal pattern. As an example, if a seasonal low pattern has component groupings for Friday, 11 p.m. to 12 a.m., Saturday, 12 a.m. to 1 a.m. and Sunday, 1 a.m. to 2 a.m., then the process may select the group corresponding to the earliest sub-period of a season. However, the components may select the component groups in any order.

At 604, the process selects a data point pair from the group. In the example where Friday 11 p.m. to 12 a.m. is selected, for instance, the group may contain four data points, denoted $x_1$, $x_2$, $x_3$, and $x_4$ from three different weeks. In this scenario, there a six possible data point pairings:

$x_1$, $x_2$;
$x_1$, $x_3$;
$x_1$, $x_4$;
$x_2$, $x_3$;
$x_2$, $x_4$; and
$x_3$, $x_4$.

The process may select one of the data point pairs in any order and proceed to 606. In other embodiments, the group may contain two, three, or more than four data points, depending on the number of sample values within the set of time-series data that have been assigned to the group.

At 606, the process determines a pairwise trend rate for the data point pair. The pairwise trend rate may be computed as the slope between the two data points. That is, the trend rate for the selected pair may be computed as follows:

$$m=(y_j-y_i)/(x_j-x_i) \qquad (9)$$

where m is the trend rate (or slope), $y_j$ is the measured value of the data point in the data point pair that occurs later in the time-series, $y_i$ is the measured value of the data point in the data point pair that occurs earlier in the time-series, $x_j$ represents the a sample number, time, or position within the time series for the data point that occurs later in the time series, and $x_i$ represents the a sample number, time, or position within the time series for the data point that occurs earlier in the time series. Once the pairwise trend rate has been computed, it may be stored in a data structure that groups pairwise trends rates for the seasonal component.

At 608, the process determines whether there are any remaining data point pairs. If there are, then the process returns to 604 and is repeated for each of the remaining data point pairs. Once a set of slopes has been generated and stored for each data point pair in the group, the process continues to 610.

At 610, the process determines whether there are any remaining groups to analyze for the seasonal pattern. If so, then the process returns to 602 and generates a set of pairwise trend slopes for each remaining seasonal component. Each seasonal component may be analyzed independently such that data points from different groups are not paired. This reduces the number of data point pairs for which trend information is generated in comparison to a Thiel-Sen estimator. It also allows the trend of individual seasonal components to be analyzed independently to estimate of the stability of the pattern itself At 612, a representative trend rate for the seasonal pattern is determined by analyzing the set of trend rates for each of the component groupings and selecting the median trend rate. For example, if a set of slopes includes ten values sorted from lowest to highest, the median would be the sum of the two middle slope values divided by two. In a set with eleven values, the median would be the middle slope value.

At 614, a representative trend intercept for the seasonal pattern is determined based, at least in part, using the representative trend rate. To determine a representative trend intercept for a particular seasonal pattern, the process may determine an intercept for each data point associated with the seasonal pattern as follows:

$$b=(y_i-t_s x_i) \qquad (10)$$

where b is the intercept, $y_i$ is the measured value for the data point for which the intercept is being computed, $t_s$ is the representative trend rate for the seasonal pattern, and $x_j$ represents the sample number, time, or position of the data point within the time-series. The representative trend intercept for the seasonal pattern may then be selected as the median intercept in the set of intercepts.

By selecting the median as a representative value, outlier slopes and intercepts may be eliminated and prevented from influencing the modelled trend of the seasonal pattern. By contrast, using an average value allows extremely large or small trend rates and intercepts, caused by data point outliers, to skew the trend rate up or down. Once the representative trend rate and intercept have been determined for a seasonal pattern, the process may repeat for other seasonal patterns to determine corresponding trend rates and intercepts/anchor points. Thus, the process may be used to compute a representative trend rate and intercept for each distinct seasonal pattern that was detected.

In one or more embodiments, rather than selecting the exact median trend rate and intercept, a median range may be defined. For example, a median range may be defined such that a slope or intercept within a predefined threshold in proximity to the middle value (or middle values) may be selected instead as the representative value. In the set with eleven values, for instance, the two values adjacent to the middle value may be selected instead or averaged together to compute the representative trend rate. Thus, there are many different ways in which the representative trend rate may be determined based on the median.

Figure 6B:
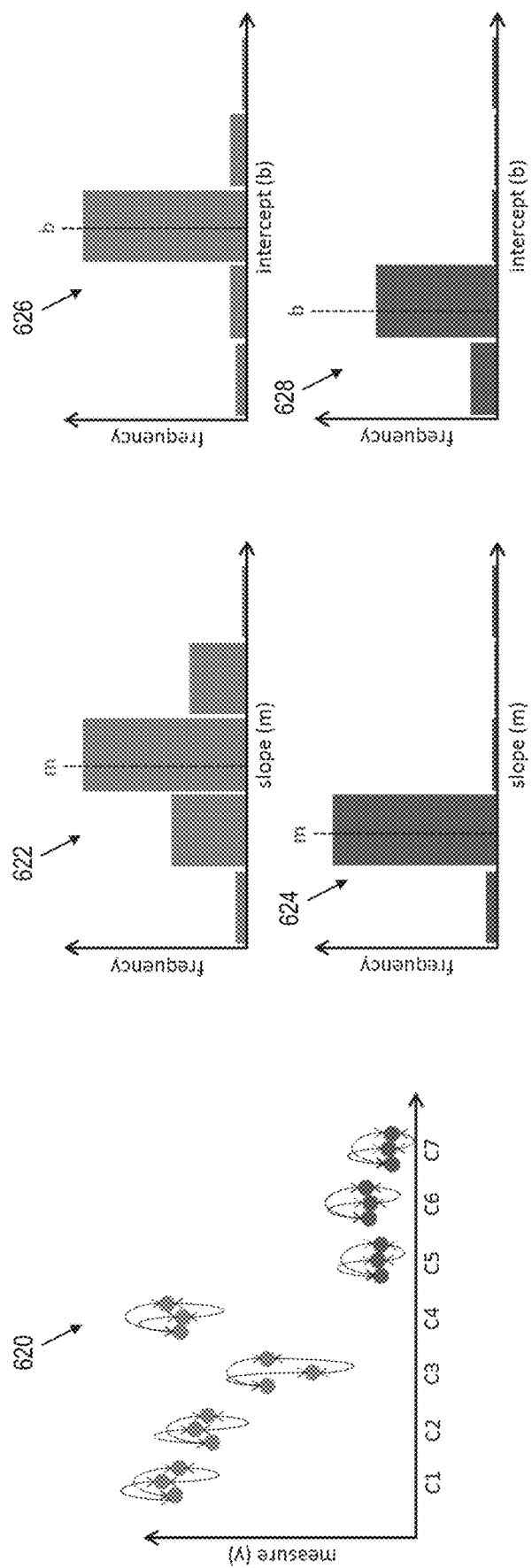
FIG. 6B illustrate an example set of results for selecting a representative trend rate and intercept for different seasonal patterns in accordance with one or more embodiments.

FIG. 6B illustrate an example set of results for selecting a representative trend rate and intercept for different seasonal patterns in accordance with one or more embodiments. Chart 620 depicts connections between the data point pairs within groups C1 to C7. As can be seen, each group includes three data points that are used to form three separate data point pairs.

Chart 622 plots the pairwise slope distribution for data point pairs within the seasonal high groups C1 to C4, and chart 624 plots the pairwise slope distribution for data point pairs within the seasonal low groups C5 to C7. The line m in each respective chart indicates the median slope for the different seasonal patterns. As can be seen, the median slope for the seasonal highs is different than the median slope for the seasonal lows. In other words, a different representative trend rate is selected for each respective seasonal pattern.

Chart 626 displays the trend intercept distribution for data points within the seasonal high groups C1 to C4, and chart 628 displays the intercept distribution for data points within the seasonal low component groups C5 to C7. As can be seen, the median intercepts for the seasonal highs differs from the median intercept for the seasonal lows. These representative intercepts may be used to trend the seasonal highs independently of the seasonal lows.

7. Temporally Weighted Pattern Trending

In one or more embodiments, the techniques for pattern trending previously described may apply temporal weighting to data point pairs. With temporal weighting, data point pairs that are more recent are given greater weight/influence toward determining the representative trend rate than data point pairs that occur earlier in the time-series. In particular, the individual pairwise slope and intercept estimates are weighted by terms that are inferred from the cycle (number of periods).

Figure 7A:
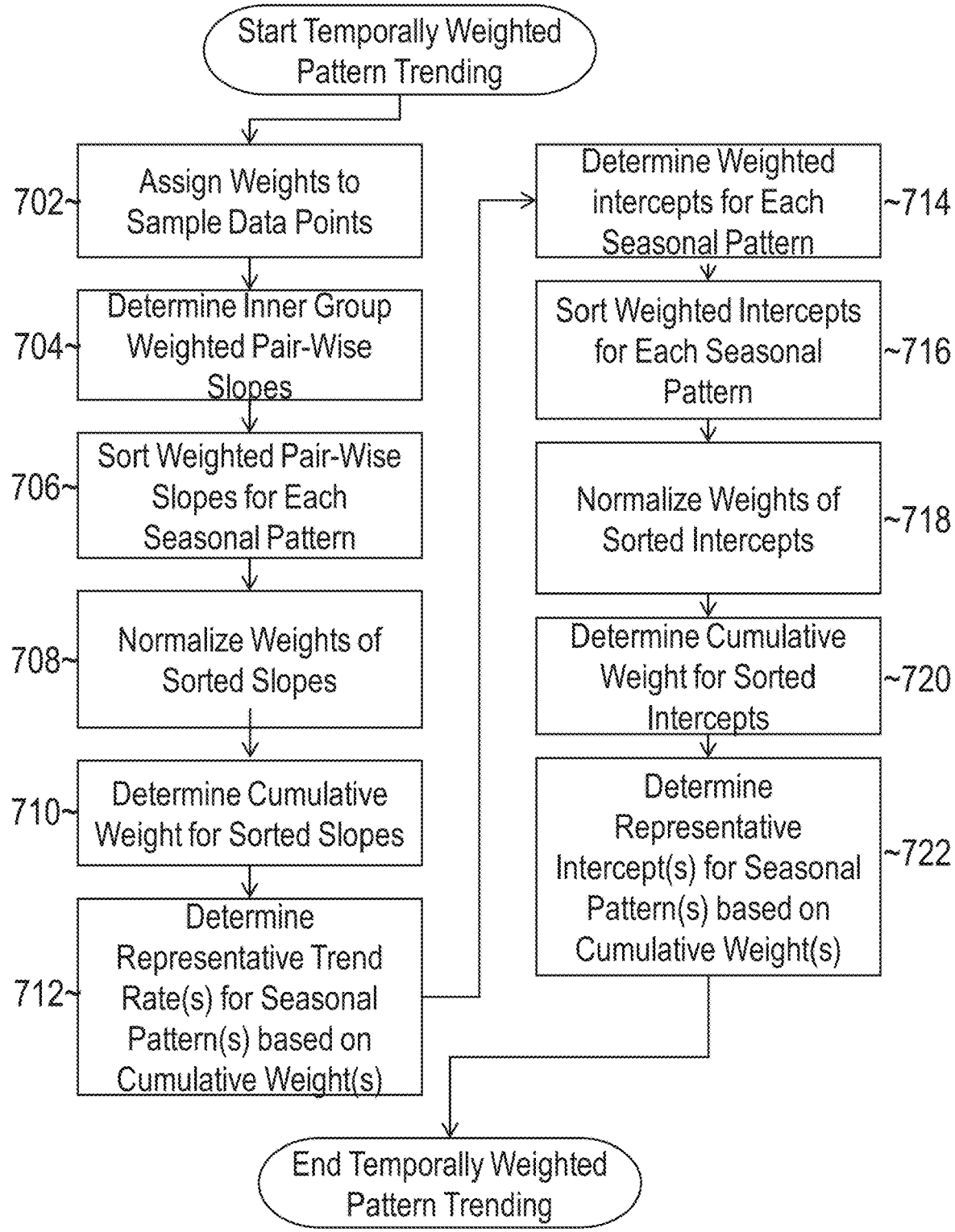
FIG. 7A illustrates an example set of operations for trending patterns using temporal weighting in accordance with one or more embodiments.

Referring to FIG. 7A, an example set of operations for trending patterns using temporal weighting is illustrated in accordance with one or more embodiments. At 702 a weight is assigned to each sample data point that is being used to train a forecasting model. In one or more embodiments, the weight is assigned as a function of the cycle in which the sample data point is found. For example, the weight may be assigned as follows:

$$w = (c/n_c) \quad (11)$$

where w is the weight value for the sample, c is the cycle that the sample is in and $n_c$ is the number of cycles used to train the forecasting model.

Figure 7B:
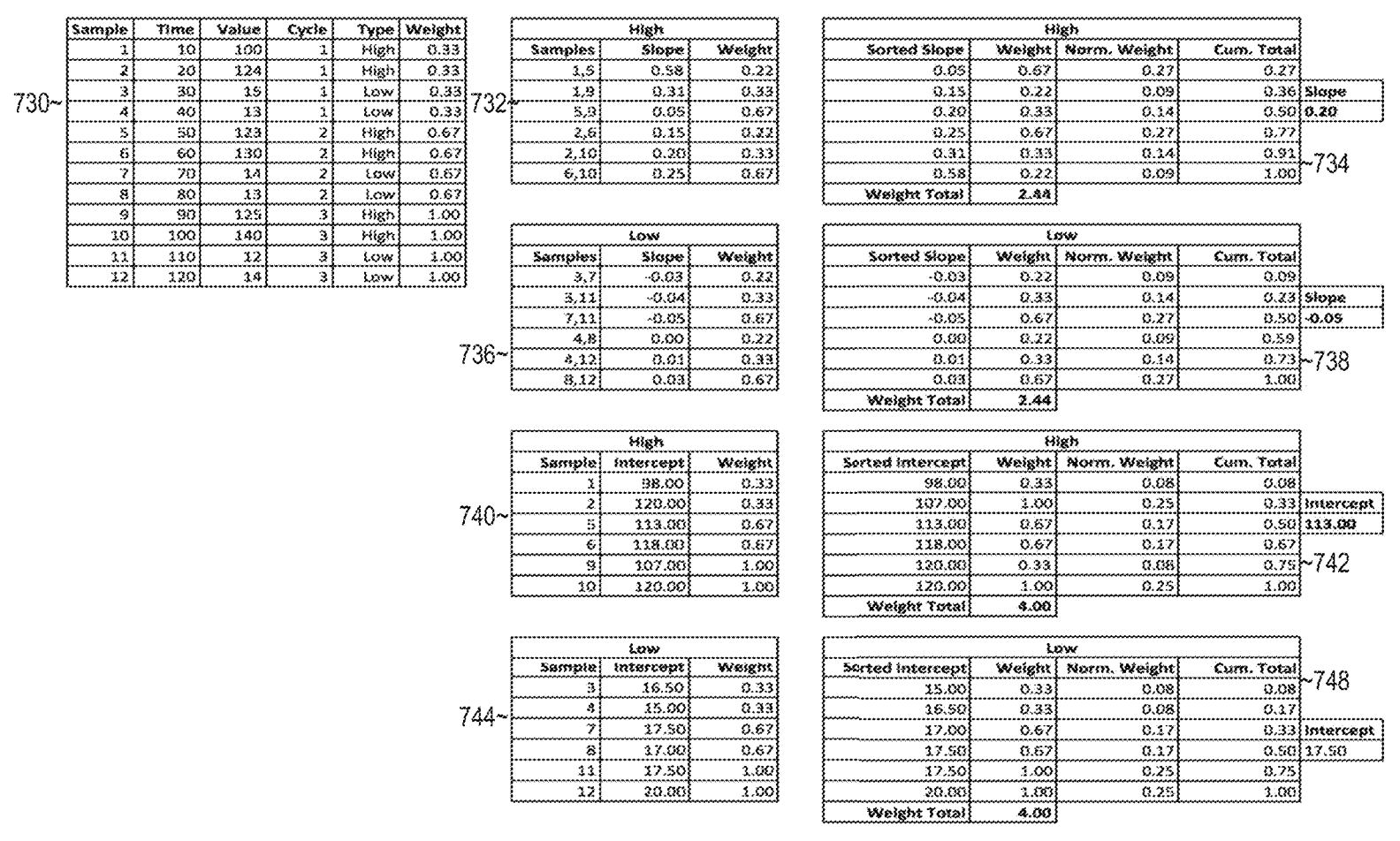

With reference to FIG. 7B, for example, table 730 stores a mapping between samples, seasonal pattern classifiers, and assigned weights. In this example there are three cycles—data points from the first seasonal cycle (e.g., the first week) are assigned a weight of 0.33, data points from the second seasonal cycle (e.g., the second week) are assigned a weight of 0.67, and data points from the third seasonal cycle (e.g., the third week) are assigned a weight of 1. Thus, data points from the most recent instance of a seasonal period are given more weight than data points in earlier instances.

Returning to FIG. 7A, at 704, the process determines inner group pair-wise trend rates. The trend rates may be computed/generated according to the techniques previously described using equations (9) above.

At 706, the pairwise slopes are sorted for each seasonal pattern. For example, a first set of pairwise slopes may be sorted for a sparse high season, a second for a dense high, a third for a dense low, etc. The slopes may be sorted, within volatiles and/or non-volatiles storage, from low to high or high to low, depending on the particular implementation.

At 708, weights are determined for the pairwise slopes based on the weights of the data point pairs. In one or more embodiments, the process determines an initial weight by multiplying the weight of each data point in the pair together. This weight may then be normalized by dividing the assigned weight value by the sum of all weights in the set of pairwise slopes for the seasonal pattern.

At 710, the process calculates a cumulative weight for each seasonal pattern. The cumulative weight may be obtained by summing the normalized weights together.

At 712, a representative trend rate is determined for each respective seasonal pattern based, at least in part, on the cumulative weight associated with each seasonal pattern. For example, the representative trend rate may be generated by interpolating to find the point at which the weights of the pairwise slopes are balanced. In one or more embodiments, the representative trend rate is the slope which is approximately fifty percent (or within a threshold range of fifty percent) of the cumulative total weight. In other words, the weighted median slope may be classified as the representative trend rate for the corresponding seasonal pattern.

Referring again to FIG. 7B, table 732 stores, for the seasonal high pattern, a mapping between data point pairs and their weighted slopes before normalization. The assigned weight is computed by multiplying the weights of each respective data point in the data point pair together. Thus, the data point pair "1, 5" has a weight of 0.33 (assigned to sample "1")×0.67 (assigned to sample "5") which is approximately 0.22.

Table 736 stores, for the seasonal low pattern, a mapping between associated data point pairs and their weighted slopes before normalization. As above for the seasonal high data points, the pairwise trend weights in table 736 are computed by multiplying the weights assigned to each individual data point in the respective data point pair.

Table 734 depicts an example mapping between the sorted pairwise slopes for the seasonal high pattern, their initially assigned weights, their normalized weights, and the cumulative total. As can be seen, the cumulative total is aggregated from low to high. The representative weight for the seasonal highs is 0.20, which is the point where the normalized weights are balanced (50% of cumulative total).

Table 738 depicts an example mapping between the sorted pairwise slopes for the seasonal low pattern, their initially assigned weights, their normalized weights, and the cumulative total. The representative weight for the seasonal lows is −0.05, which is the point where the normalized weights are balanced (50% of cumulative total).

Once assigned to a seasonal pattern, the representative slope may then be used to determine a representative intercept. Referring again to FIG. 7A, at 714, the process determines a set of weighted intercepts for each seasonal pattern. The intercept for a given data point may be computed according to equation (10) above using the representative trend rate for the seasonal pattern. The weights that are assigned to each intercept in this case is the weight of the data point used to compute the intercept.

At 716, the process sorts the weighted intercepts for each seasonal pattern. For example, a first set of intercepts may be sorted for a sparse high season, a second for a dense high, a third for a dense low, etc. The intercepts may be sorted, within volatiles and/or non-volatiles storage, from low to high or high to low, depending on the particular implementation.

At 718, the weights of the intercepts are normalized. In one or more embodiments, the weight of an intercept is normalized by dividing the weight by the sum of all weights assigned to intercepts in the sorted set of intercepts for each seasonal pattern.

At 720, the process calculates a cumulative weight for each seasonal pattern. The cumulative weight may be obtained by summing the normalized weights for the intercepts together.

At 722, the process determines a representative intercept for each seasonal pattern based on the cumulative weights computed for each seasonal pattern. For example, the representative trend intercept may be generated by interpolating to find the point at which the weights of the intercepts are balanced. In one or more embodiments, the representative intercept is the intercept which is approximately fifty percent (or within a threshold range of fifty percent) of the cumulative total weight. In other words, the weighted median intercept may be classified as the representative intercept for the corresponding seasonal pattern.

Referring again to FIG. 7B, table 740 stores, for the seasonal high pattern, a mapping between data points, and their weighted intercepts before normalization. The assigned intercept weight is the same weight as the data point used to compute the intercept. Thus, the intercept computed using the first sample data point has a weight of 0.33 since the sample is from the first cycle of the time-series.

Table 742 depicts an example mapping between the sorted intercepts for the seasonal high pattern, their initially assigned weights, their normalized weights, and the cumulative total. As can be seen, the cumulative total is aggregated from low to high. The representative intercept for the seasonal highs is 113, which is the point where the normalized weights are balanced (50% of cumulative total).

Table 744 stores, for the seasonal low pattern, a mapping between data points, and their weighted intercepts before normalization. As above for the seasonal high data points, the intercepts weights are the same as the data points used to compute the intercept.

Table 748 depicts an example mapping between the sorted intercepts for the seasonal low pattern, their initially assigned weights, their normalized weights, and the cumulative total. The representative intercept for the seasonal lows is 17.5, which is the point where the normalized weights are balanced (50% of cumulative total).

8. Forecast Generation

Forecasting logic 250 performs seasonal forecasting based on the seasonal characteristics associated with an input set of time series data, including the pattern trending previously discussed. In one or more embodiments, in addition to the set of trend rates T and the set of trend intercepts I, forecasting logic 250 may further receive as input, the set of time-series data D, the set of seasonal pattern identification data P, and a horizon identifying how far past the end of the time series to generate forecasted values. Forecasting logic 250 process the inputs to generate a forecast that begins at the end of the input time series and progresses up to the specified horizon. If a client requests a forecast for an n week horizon, for instance, forecasting logic 250 may generate the set of forecast data F that includes projected values for n weeks past the end time of the input time series. The horizon may be specified as a particular date or as a stretch of time in terms of hours, days, months, etc.

Referring to FIG. 7A, an example set of operations for generating a forecast using different trends rates and intercepts for different seasonal patterns is depicted in accordance with one or more embodiments. At block 802, the process identifies a sequent of sub-periods for which to generate projected values. For example, if a client has requested a forecast that projects values one week into the future with a sample rate of one hour sub-periods, the process may identify 168 different sub-periods corresponding to different hours within the week. The number of sub-periods may vary from implementation to implementation depending on the length of the requested forecast and the sample sub-period duration.

At 804, the process selects a sub-period for which to generate a projected value. For instance, the process may start at the first sub-period from the end of the input time series and continue toward the end of the forecast horizon. In the context of a one week forecast, for example, the first sub-period may be the first hour of the week or the first hour from the time the forecast is requested. The process may then proceed to generate forecasted values for each subsequent hour until the end of the week is reached.

At 806, the process determines the seasonal pattern that is associated with the selected sub-period. As an example, if the selected sub-period corresponds to Monday, 9-10, then the process may determine whether the sub-period has been classified as a sparse high, dense high, sparse low, dense low, or some other pattern classification.

At 808, the process generates a projected value based on the representative trend rate and intercept for the associated seasonal pattern. In the context where values are grouped into a sparse high class, a high class, and a low class, the forecasted value at sample/sub-period (t) may be calculated as follows:

If t maps to a sparse high, then $$F_t = SF_t + TR\_SH_{t-i} + A\_SH \quad (12)$$

If t maps to a high, then $$F_t = SF_t + TR\_H_{t-i} + A\_H \quad (13)$$

Otherwise $$F_t = SF_t + TR\_NH_{t-i} + A\_NH \quad (14)$$

where $F_t$ represents the forecast value for the sample at the given sub-period/time, $SF_t$ is the seasonal factor for that sub-period, $TR\_SH_{t-i}/TR\_H_{t-i}/TR\_NH_{t-i}$ represent the trend rate for sparse high, high and not high, respectively, i represents the end time of the input time series, and A_SH/A_H/A_NH represent the anchor points for sparse high, high and not high, respectively.

At block 810, the process determines whether there are remaining sub-periods for which to generate forecasted values. If the horizon has not been reached, then the process returns to 804 and selects the next sub-period in the sequence. The process then computes the forecasted value for the next sub-period based on how the corresponding sub-period has been classified. If there are no remaining sub-periods in the sequence, then the process continues to block 812.

At 812, the process stores, displays, and/or otherwise outputs the projected values in the forecast. For example, a graph, chart, or other display may be generated that combines observed values from one or more observed seasonal periods within the time series with projected values for one or more future seasonal periods for which no observed data has been collected. The projected values for the different seasonal classes may be stitched together or otherwise combined into a single plot or other graphic to provide an overall forecast and/or may be isolated into separate graphics.

Figure 8A:
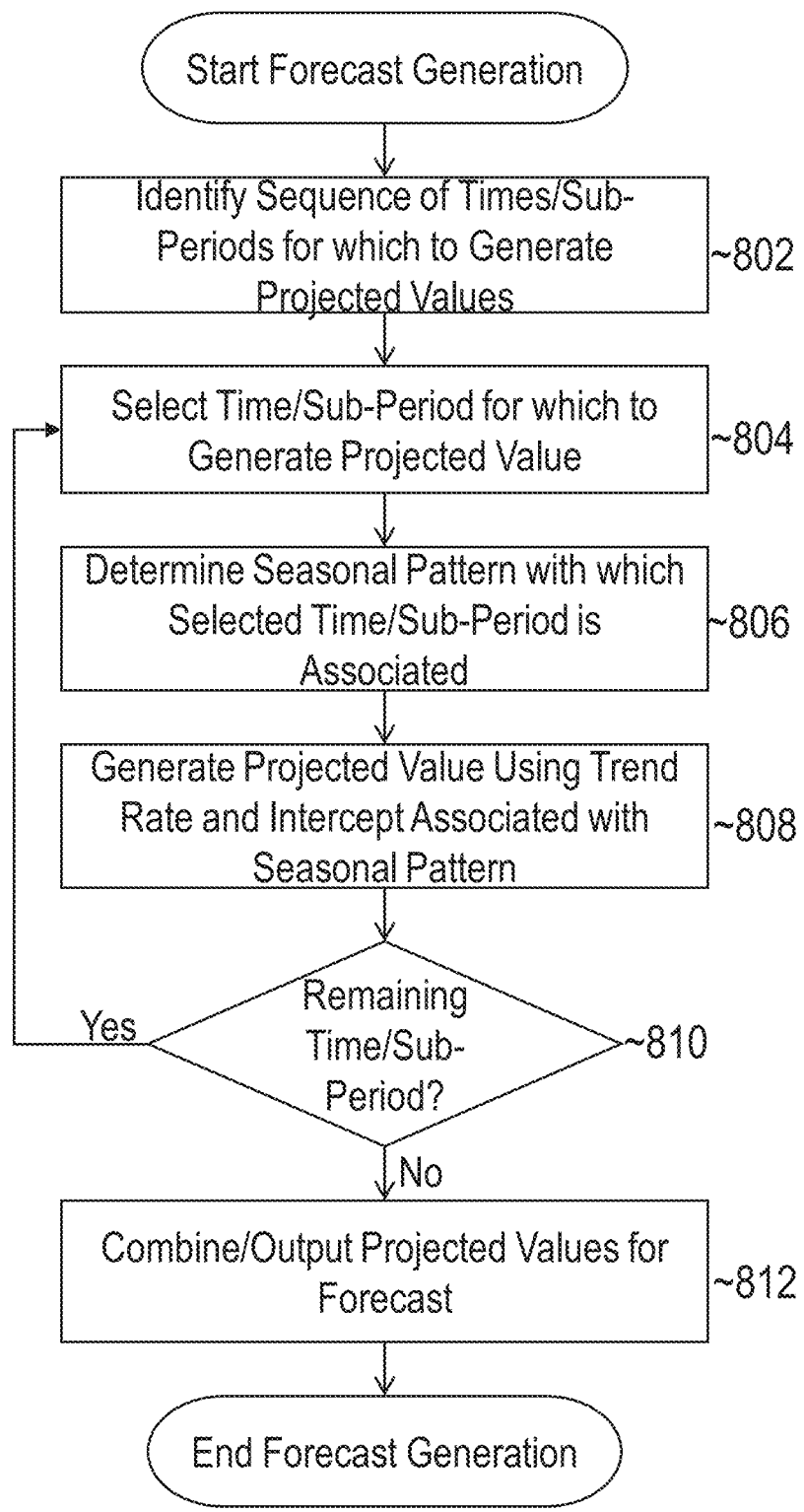
FIG. 8A illustrates an example set of operations for generating a forecast using different trends rates and intercepts for different seasonal patterns in accordance with one or more embodiments.
Figure 8B:
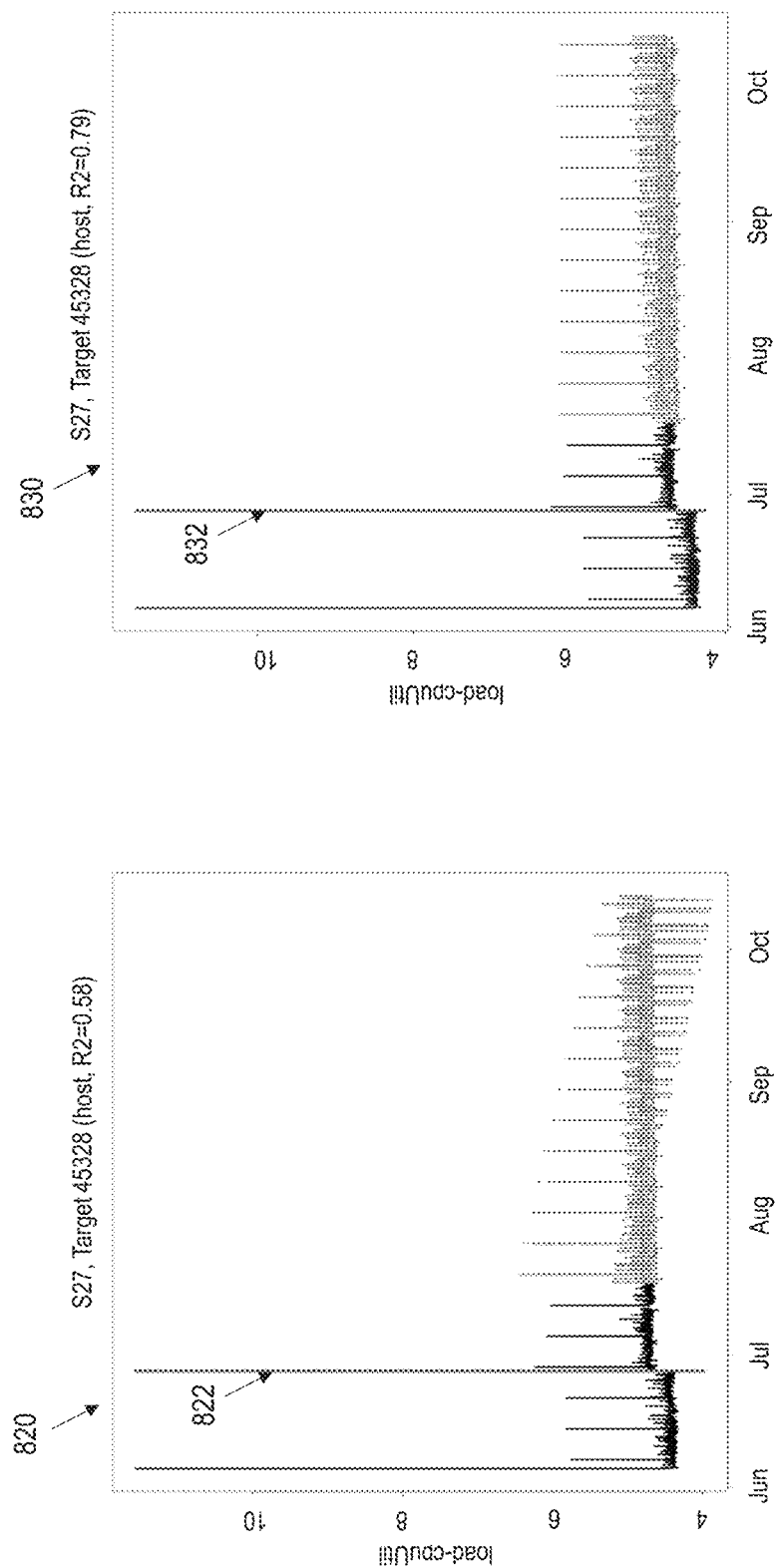
FIG. 8B illustrates a difference in forecasts that result from regression-based trending of a sample and pattern-based trending in accordance with one or more embodiments.

FIG. 8B illustrates a difference in forecasts between sample trending and pattern trending in accordance with one or more embodiments. Chart 820 displays example forecast results when samples are trended. The line 822 indicates a "tipping point" as described in U.S. application Ser. No. 15/266,979, entitled "SYSTEMS AND METHODS FOR DETECTING AND ACCOMMODATING STATE CHANGES IN MODELLING". Time-series data before line 822 is ignored when training the forecasting model. By trending based on where data points fall within a sample week period, a negative trend is inferred in the sparse highs. This negative trend is inferred because in the small set of data used to training the forecasting model, sparse highs occur earlier in the week. An unsupervised seasonality classification model may sometimes select lower values that occur later in the week as highs, pulling down the trend rate and leading to inaccurate forecast results for the sparse high pattern. If the sparse highs had occurred later in the week, then a large positive trend may be incorrectly inferred. Thus, by trending on the sample rather than the pattern, the location of data points within the sample may significantly affect the trend rate calculation.

Chart 830 displays an example forecast where pairwise trend slopes and intercepts are used to trend the patterns. Once again, line 832 indicates the tipping point, and data before this time is not used to train the forecasting model. As can be seen, the sparse highs in this instance are relatively stable. Thus, using pairwise trend slopes analyzes the overall trend of the pattern rather than where data points occur within an arbitrary window of time within a season. This allows more accurate forecasts to be generated for the time-series data and seasonal patterns therein.

9. Forecast Uncertainty Based on Seasonal Pattern Classifications

In one or more embodiments, forecasting logic 250 determines a set of one or more uncertainty values for a given forecast. The uncertainty values may include residuals, confidence intervals, projection intervals, and/or tolerance intervals depending on the particular implementation.

A tolerance interval models uncertainty in a way that allows the user to understand whether or not the system has a significant likelihood of exceeding a tolerance. Confidence intervals, which may also be computed for a forecasting model, differ in that the confidence interval is used to indicate an interval where the average value or variance within a forecast is expected to fall. By contrast, the tolerance interval is used to indicate a range where an individual forecasted value is expected to fall. In other words a tolerance interval may be mathematically defined to be the range of values that will contain a threshold percentage of future samples. The confidence interval's width is based on the sampling error and is generally narrower than the tolerance interval's width, which is based both on the sampling error and the variance in values.

The tolerance interval for a prescribed confidence of $\gamma$ may defined to be $\bar{x} \pm \lambda s$ such that $$\frac{1}{\sqrt{2\pi\sigma^2}} \int_{x-\lambda s}^{x+\lambda s} e^{-(t-\mu)^2/2\sigma^2} dt \geq \gamma; \quad (15)$$

where $\bar{x}$ is the sample mean, $s^2$ is the sample variance, $\sigma$ is the standard deviation, and t is the sample time.

In some cases, the tolerance interval may be focuses on the standard normal distribution without loss of generality. As a result, the tolerance interval can also be defined to be $\bar{x} \pm \lambda s$ such that $$\frac{1}{\sqrt{2\pi}} \int_{x-\lambda s}^{x+\lambda s} e^{-t^2/2} dt \geq \gamma \quad (16)$$

The integral statement of Eq. 13 translates to a statement where $\lambda s \geq r$ with r being the root of $$\frac{1}{\sqrt{2\pi}} \int_{x-r}^{x+r} e^{-t^2/2} dt = \gamma.$$

Upon further analysis, $\lambda s \geq r$ may be rewritten as $$(n-1)s^2 \geq \frac{(n-1)r^2}{\lambda^2}.$$

The reason for this modification is that for the standard normal distribution, $(n-1)s^2$ has a chi-squared distribution with n−1 degrees of freedom. If the confidence of the fit is equal to the confidence of the tolerance interval (i.e. $\beta=\gamma$) then this results in the following:

$$\chi^2_{n-1,\gamma} \geq (n-1)s^2 \geq \frac{(n-1)r^2}{\lambda^2} \quad (17)$$

With further analysis, it may be determined that $$\lambda \geq \sqrt{\frac{(n-1)r^2}{\chi^2_{n-1,\gamma}}}$$

and as a result, the following equation derived:

$$r^2 \approx \left(1 + \frac{1}{n}\right) z^2_{(1-\gamma)/2}. \quad (18)$$

As with the projected values described above, uncertainty values may be derived based in part on the seasonality analytics applied to a set of time series.

In an embodiment, the forecast high and low are generated by adding or subtracting, respectively, the uncertainty from the forecasted value. For instance the following equations may be used to compute the forecast high and low for sample sub-period t:

If t maps to a sparse high, then $$FH_t = F_t + USH \quad (19)$$

$$FL_t = F_t - USH \quad (20)$$

If t maps to a high, then $$FH_t = F_t + UH \quad (21)$$

$$FL_t = F_t - UH \quad (22)$$

Otherwise $$FH_t = F_t + UNH \quad (23)$$

$$FL_t = F_t - UNH \quad (24)$$

where $FH_t$ is the forecast high value, $FL_t$ is the forecast low value, $F_t$ is the projected forecast value, USH is the sparse high uncertainty computed from the residuals from the sparse high class, UH is the high uncertainty computed from the residuals from the high class, and UNH is the uncertainty computed from the residuals from samples that were not classified as seasonal highs (sparse or dense).

10. Seasonally-Aware Capacity Planning

Seasonal forecasting may be used to facilitate and/or automatically perform capacity planning decisions and operations, according to one or more embodiments. Underestimating future resource usage may lead to significant decreases in performance if the deployed resources are overloaded. With a separate treatment of sparse highs from dense highs and lows, as previously described, the impact of low usage periods on the forecast may be mitigated, thereby reducing the likelihood that peak resource usage parameters will be underestimated.

In an embodiment, the projected values may be used to plan, deploy, recommend, and/or order resources to handle increased resource usage. Different actions and/or recommendations may be set to trigger upon detecting that a projected value or trend exceeds a threshold. As an example, the projected sparse high values may indicate that resource usage will exceed a threshold thereby overloading current resources at a future time. In response, the system may recommend additional hardware and/or software resources to satisfy the projected increase in resource usages.

In another embodiment, the projected values may be used to consolidate resources. For instance, if resource usage is projected to decline past a threshold, then the system may recommend or automatically consolidate hardware and/or software resources to more efficiently utilize these resources and free up resources for other applications.

Based on a seasonal forecast, administrators may determine a variety of characteristics associated with a particular resource or set of resources. For instance, the forecast may indicate whether there is a high risk of exhaustion for the resource, a high risk for exhaustion for batch (sparse) jobs but low risk for typical (dense) workloads, a low risk for exhaustion but increasing trend, a consistent, predictable scheduled load, a decreasing trend in load, etc. In the context of a clustered database that is distributed across multiple hosts, a user may determine if the system or any instance is likely to run out of capacity within the next 30 days (or some other horizon). The user may also determine if the load for two or more applications may be handled by a single database instance.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates computer system 900 upon which one or more embodiments may be implemented. Computer system 900 includes bus 902 or other communication mechanism for communicating information, and hardware processor 904 coupled with bus 902 for processing information. Hardware processor 904 may be, for example, a general purpose microprocessor.

Computer system 900 also includes main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes read only memory (ROM) 908 or other static storage device coupled to bus 902 for storing static information and instructions for processor 904. Storage device 910, such as a magnetic disk or optical disk, is provided and coupled to bus 902 for storing information and instructions.

Computer system 900 may be coupled via bus 902 to display 912, such as a cathode ray tube (CRT), liquid crystal display (LCD), or light-emitting diode (LED), for displaying information to a computer user. Input device 914, which may include physical and/or touchscreen based alphanumeric keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to host computer 924 or to data equipment operated by Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, server 930 might transmit a requested code for an application program through Internet 928, ISP 926, local network 922 and communication interface 918.

The received code may be executed by processor 904 as it is received, and/or stored in storage device 910, or other non-volatile storage for later execution.

12. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:

classifying, by a machine learning process, a first set of data points within a set of time-series data as sparse seasonal highs and a second set of data points within the set of time-series data as dense seasonal highs, wherein the sparse seasonal highs have a duration less than a threshold within a seasonal period, wherein the dense seasonal highs have a duration that satisfies the threshold within the seasonal period;

generating, within at least one of volatile or non-volatile storage based on said classifying, a plurality of groups of data points including (a) a first group that includes the first set of data points and represents sparse seasonal highs, and (b) a second group that includes the second set of data points and represents dense seasonal highs, wherein the first group of data points and the second group of data points span multiple cycles of the seasonal period;

determining a set of pairwise slopes for data point pairs formed from data points that are in the first group of data points representing sparse seasonal highs and not in the second group of data points representing dense seasonal highs and that are separated by at least one cycle of the seasonal period;

assigning a respective weight to each respective pairwise slope in the set of pairwise slopes as a function of which seasonal cycle each data point used to compute the respective pairwise slope is in relative to other data points in the first group, wherein data points in a first seasonal cycle are assigned a first weight and wherein data points in a second seasonal cycle are assigned a second weight that is different than the first weight;

determining a cumulative weight for the sparse seasonal highs that is a balance for a cumulative total obtained by aggregating the respective weight for each respective pairwise slope in the set of pairwise slopes;

determining, based at least in part on the cumulative weight for the sparse seasonal highs and the plurality of pairwise slopes constrained to the set of pairwise slopes for data point pairs formed from data points that are in the first group of data points representing sparse seasonal highs and not in the second group of data points representing dense seasonal highs and that are separated by at least one cycle of the seasonal period, a representative trend rate for the seasonal highs;

training a forecasting model based on the representative trend rate such that data points in the first group of data points representing sparse seasonal highs are not paired with data points from the second group of data points representing dense seasonal highs such that data points representing sparse seasonal highs are trended independently of data points representing dense seasonal highs;

generating, within at least one of volatile or non-volatile storage using the trained forecasting model and based at least in part on the representative trend rate for the sparse seasonal highs, a set of forecasted sparse seasonal high values; and deploying or consolidating at least one computing resource to account for projected resource utilization in the set of forecasted sparse seasonal high values.

2. The method of claim 1, wherein determining the representative trend rate for the sparse seasonal highs comprises interpolating to find a slope that is approximately fifty percent of the cumulative total weight.

3. The method of claim 1, further comprising:
determining, using the representative trend rate for the sparse seasonal highs, a set of intercept values for data points that are associated with the sparse seasonal highs;
determining, based at least in part on the set of intercept values, a representative intercept for a trend of the sparse seasonal highs;
wherein the set of forecasted sparse seasonal high values is further generated based, at least in part, on the representative intercept.

4. The method of claim 3, wherein the representative intercept is at least one median intercept value in the set of intercept values.

5. The method of claim 1, further comprising:
determining, based on at least a second set of pairwise slopes, a second representative trend rate for seasonal lows; and
generating, within at least one of volatile or non-volatile storage, a second set of forecasted seasonal low values based, at least in part, on the second representative trend rate for the seasonal lows;
wherein the second representative trend rate is different than the first representative trend rate.

6. The method of claim 1, wherein the representative trend rate is a weighted median that is determined based, at least in part, on the cumulative weight for the sparse seasonal highs, the method further comprising determining a second cumulative weight for seasonal lows and a second representative trend rate from a second weighted median that is based, at least in part, on the second cumulative weight for the seasonal lows.

7. One or more non-transitory computer-readable media storing instructions, which when executed by one or more hardware processors, cause operations comprising:
classifying, by a machine learning process, a first set of data points within a set of time-series data as sparse seasonal highs and a second set of data points within the set of time-series data as dense seasonal highs, wherein the sparse seasonal highs have a duration less than a threshold within a seasonal period, wherein the dense seasonal highs have a duration that satisfies the threshold within the seasonal period;
generating, within at least one of volatile or non-volatile storage based on said classifying, a plurality of groups of data points including (a) a first group that includes the first set of data points and represents sparse seasonal highs, and (b) a second group that includes the second set of data points and represents dense seasonal highs, wherein the first group of data points and the second group of data points span multiple cycles of the seasonal period;
determining a set of pairwise slopes for data point pairs formed from data points that are in the first group of data points representing sparse seasonal highs and not in the second group of data points representing dense seasonal highs and that are separated by at least one cycle of the seasonal period;
assigning a respective weight to each respective pairwise slope in the set of pairwise slopes as a function of which seasonal cycle each data point used to compute the respective pairwise slope is in relative to other data points in the first group, wherein data points in a first seasonal cycle are assigned a first weight and wherein data points in a second seasonal cycle are assigned a second weight that is different than the first weight;
determining a cumulative weight for the sparse seasonal highs that is a balance for a cumulative total obtained by aggregating the respective weight for each respective pairwise slope in the set of pairwise slopes;
determining, based at least in part on the cumulative weight for the sparse seasonal highs and the plurality of pairwise slopes constrained to the set of pairwise slopes for data point pairs formed from data points that are in the first group of data points representing sparse seasonal highs and not in the second group of data points representing dense seasonal highs and that are separated by at least one cycle of the seasonal period, a representative trend rate for the seasonal highs;
training a forecasting model based on the representative trend rate such that data points in the first group of data points representing sparse seasonal highs are not paired with data points from the second group of data points representing dense seasonal highs such that data points representing sparse seasonal highs are trended independently of data points representing dense seasonal highs;
generating, within at least one of volatile or non-volatile storage using the trained forecasting model and based at least in part on the representative trend rate for the sparse seasonal highs, a set of forecasted sparse seasonal high values; and
deploying or consolidating at least one computing resource to account for projected resource utilization in the set of forecasted sparse seasonal high values.

8. The one or more non-transitory computer-readable media of claim 7, wherein instructions for determining the representative trend rate for the sparse seasonal highs comprise instructions for interpolating to find a slope that is approximately fifty percent of the cumulative total weight.

9. The one or more non-transitory computer-readable media of claim 7, wherein the instructions further cause operations comprising:
determining, using the representative trend rate for the sparse seasonal highs, a set of intercept values for data points that are associated with the sparse seasonal highs;
determining, based at least in part on the set of intercept values, a representative intercept for a trend of the sparse seasonal highs;
wherein the set of forecasted sparse seasonal high values is further generated based, at least in part, on the representative intercept.

10. The one or more non-transitory computer-readable media of claim 9, wherein the representative intercept is at least one median intercept value in the set of intercept values.

11. The one or more non-transitory computer-readable media of claim 7, wherein the instructions further causing operations comprising:
determining, based on at least a second set of pairwise slopes, a second representative trend rate for seasonal lows; and
generating, within at least one of volatile or non-volatile storage, a second set of forecasted seasonal low values based, at least in part, on the second representative trend rate for the seasonal lows;
wherein the second representative trend rate is different than the first representative trend rate.

12. The one or more non-transitory computer-readable media of claim 7, wherein the representative trend rate is a weighted median that is determined based, at least in part, on the cumulative weight for the sparse seasonal highs, wherein the instructions further cause determining a second cumulative weight for seasonal lows and a second representative trend rate from a second weighted median that is based, at least in part, on the second cumulative weight for the seasonal lows.

13. The one or more non-transitory computer-readable media of claim 7, wherein determining the cumulative weight comprises generating a normalized weight for the respective weight assigned to each respective pairwise slope by dividing a sum of all weights assigned to the set of pairwise slopes.

14. The one or more non-transitory computer-readable media of claim 13, wherein the cumulative weight is determined by summing the normalized weight for each respective pairwise slope.

15. The one or more non-transitory computer-readable media of claim 7, wherein the respective weight assigned to the respective pairwise slope is determined by multiplying a temporal weight assigned to each data point used to compute the respective pairwise slope.

16. The one or more non-transitory computer-readable media of claim 7, wherein the first weight and the second weight are computed as $c/n_c$, where c represents which seasonal cycle the data points are in and $n_c$ represents a number of seasonal cycles used to train the forecasting model.

17. The one or more non-transitory computer-readable media of claim 7, where in the instructions further cause applying a homogenization function to classify unclassified sub-periods with the seasonal period.

18. A system comprising:
one or more hardware processors;
one or more non-transitory computer-readable media storing instructions which, when executed by the one or more hardware processors, cause operations comprising:
classifying, by a machine learning process, a first set of data points within a set of time-series data as sparse seasonal highs and a second set of data points within the set of time-series data as dense seasonal highs, wherein the sparse seasonal highs have a duration less than a threshold within a seasonal period, wherein the dense seasonal highs have a duration that satisfies the threshold within the seasonal period;
generating, within at least one of volatile or non-volatile storage based on said classifying, a plurality of groups of data points including (a) a first group that includes the first set of data points and represents sparse seasonal highs, and (b) a second group that includes the second set of data points and represents dense seasonal highs, wherein the first group of data points and the second group of data points span multiple cycles of the seasonal period;
determining a set of pairwise slopes for data point pairs formed from data points that are in the first group of data points representing sparse seasonal highs and not in the second group of data points representing dense seasonal highs and that are separated by at least one cycle of the seasonal period;
assigning a respective weight to each respective pairwise slope in the set of pairwise slopes as a function of which seasonal cycle each data point used to compute the respective pairwise slope is in relative to other data points in the first group, wherein data points in a first seasonal cycle are assigned a first weight and wherein data points in a second seasonal cycle are assigned a second weight that is different than the first weight;
determining a cumulative weight for the sparse seasonal highs that is a balance for a cumulative total obtained by aggregating the respective weight for each respective pairwise slope in the set of pairwise slopes;
determining, based at least in part on the cumulative weight for the sparse seasonal highs and the plurality of pairwise slopes constrained to the set of pairwise slopes for data point pairs formed from data points that are in the first group of data points representing sparse seasonal highs and not in the second group of data points representing dense seasonal highs and that are separated by at least one cycle of the seasonal period, a representative trend rate for the seasonal highs;
training a forecasting model based on the representative trend rate such that data points in the first group of data points representing sparse seasonal highs are not paired with data points from the second group of data points representing dense seasonal highs such that data points representing sparse seasonal highs are trended independently of data points representing dense seasonal4ows highs;
generating, within at least one of volatile or non-volatile storage using the trained forecasting model and based at least in part on the representative trend rate for the sparse seasonal highs, a set of forecasted sparse seasonal high values; and
deploying or consolidating at least one computing resource to account for projected resource utilization in the set of forecasted sparse seasonal high values.

19. The system of claim 18, wherein instructions for determining the representative trend rate for the sparse seasonal highs comprise instructions for interpolating to find a slope that is approximately fifty percent of the cumulative total weight.

20. The system of claim 18, wherein the instructions further cause operations comprising:
determining, using the representative trend rate for the sparse seasonal highs, a set of intercept values for data points that are associated with the sparse seasonal highs;
determining, based at least in part on the set of intercept values, a representative intercept for a trend of the sparse seasonal highs;
wherein the set of forecasted sparse seasonal high values is further generated based, at least in part, on the representative intercept.

\* \* \* \* \*

UNITED STATES PATENT AND TRADEMARK OFFICE
CERTIFICATE OF CORRECTION

PATENT NO. : 11,113,852 B2
APPLICATION NO. : 15/266987
DATED : September 7, 2021
INVENTOR(S) : Garvey et al.

Page 1 of 2

It is certified that error appears in the above-identified patent and that said Letters Patent is hereby corrected as shown below:

On the Title Page

On page 3, Column 2, item (56) under Other Publications, Line 4, delete "Infrustructure 'OpenStak'," and insert -- Infrastructure 'OpenStack', --, therefor.

On page 3, Column 2, item (56) under Other Publications, Line 68, delete "US.pdi" and insert -- US.pdf --, therefor.

On page 4, Column 2, item (56) under Other Publications, Line 14, delete "pattem" and insert -- pattern --, therefor.

In the Specification

In Column 12, Line 45, after "low season" insert -- . --.

In Column 15, Line 47, delete "$y_j$" and insert -- $y_i$ --, therefor.

In Column 15, Line 49, delete "the a" and insert -- the --, therefor.

In Column 15, Line 51, delete "the a" and insert -- the --, therefor.

In Column 16, Line 2, delete "Thiel-Sen" and insert -- Theil-Sen --, therefor.

In Column 16, Line 5, after "itself" insert -- . --.

In Column 16, Line 24, delete "$x_j$" and insert -- $x_i$ --, therefor.

In Column 21, Line 41, after "may" insert -- be --.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

In the Claims

In Column 30, Line 33, in Claim 18, delete "seasonal4ows" and insert -- seasonal --, therefor.